US006980340B1

(12) United States Patent
Okura et al.

(10) Patent No.: US 6,980,340 B1
(45) Date of Patent: Dec. 27, 2005

(54) ROTARY DEFLECTOR, OPTICAL SCANNING UNIT AND IMAGE FORMING APPARATUS

(75) Inventors: Masayoshi Okura, Ebina (JP); Takahiko Kobayashi, Ebina (JP); Tehli Shao, Ebina (JP); Masahiko Otsu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/613,742

(22) Filed: Jul. 11, 2000

(30) Foreign Application Priority Data

Sep. 9, 1999 (JP) .................................. 11-255592

(51) Int. Cl.[7] ............................................ G02B 26/08
(52) U.S. Cl. ...................... 359/200; 359/216; 359/872
(58) Field of Search ............................... 359/196–198, 359/200–221, 223, 226, 872; 347/243, 259–261; 310/66, 91, 90.5

(56) References Cited

U.S. PATENT DOCUMENTS 4,623,216 A * 11/1986 Sato et al. .................. 359/200
5,606,448 A * 2/1997 Suzuki et al. ............... 359/200
5,946,122 A * 8/1999 Itoh et al. ................... 359/200
5,963,353 A * 10/1999 Shibuya et al. ............. 359/198
6,172,786 B1 * 1/2001 Fujita et al. ................ 359/200
6,188,503 B1 * 2/2001 Hisa .......................... 359/200

FOREIGN PATENT DOCUMENTS

| JP | 64-10209 | 1/1989 |
|----|----------|--------|
| JP | 1-82664 | 6/1989 |
| JP | 5-70184 | 9/1993 |
| JP | 5-264916 | 10/1993 |
| JP | 9-126229 | 5/1997 |

* cited by examiner

Primary Examiner—James Phan
(74) Attorney, Agent, or Firm—Morgan Lewis & Bockius LLP

(57) ABSTRACT

The inventive device reduces noises and stabilizes the image quality of an image forming apparatus by reducing vibration thereof by reducing vibration of a driving source itself within a preset frequency range without changing the resonating condition of a housing. A mass member is added to a stationary shaft of a driving motor for rotating a polygon mirror. It then becomes possible to reduce the vibration and noise of an image forming apparatus by avoiding resonation by moving a resonance point by adding the mass member to the stationary shaft. Thus, a high image quality image forming apparatus can be realized.

6 Claims, 26 Drawing Sheets

ROTARY DEFLECTOR, OPTICAL SCANNING UNIT AND IMAGE FORMING APPARATUS

BACKGROUND OF THE INVENTION

1. Field of the Invention

The present invention relates to a rotary deflector, an optical scanning unit and an image forming apparatus for use in a laser printer, a digital copier and the like.

2. Related Art

An optical scanning unit is provided with a driving motor for rotating a polygon mirror at high speed. However, it is unable to realize a high image quality because optical parts vibrate, scanning position deviates periodically and nonuniformity of pitch occurs on an image unless vibration caused by the driving motor is reduced. Still more, noise may be generated when a housing of the optical scanning unit resonates with a base of the image forming apparatus.

In order to eliminate such a problem, Japanese Patent Laid-Open No. Hei. 5-264916 has disclosed a method of controlling the resonating condition of the housing by changing fixing points of the base and the housing of the image forming apparatus per type of machine or by increasing/reducing a mass element to be added to the housing, to avoid the resonance frequency of the housing in correspondence to changes of vibrating frequency of a source of vibration.

However, there has been a problem that when the fixing points of the housing are changed, the position of a laser beam fluctuates and the image quality degrades because the amount and the mode of deformation of the housing change.

The driving motor for rotating the polygon mirror is arranged so as to switch the rotational speed during the standby state and the image forming time to reduce power consumption and to switch the rotational speed corresponding to an image density in order to accommodate to plural image densities (resolutions).

However, because the above-mentioned prior arts have had no arrangement of reducing the vibration of the vibrating source itself, there has been a problem that when the rotational speed is changed, the vibrating frequency of the driving motor approaches to the vibrating frequency of the housing, thus resonating and causing noise.

SUMMARY OF THE INVENTION

The present invention has been made in order to solve the above-mentioned problem and reduces noises and stabilizes the image quality by reducing vibration of the image forming apparatus by reducing vibration of the driving source itself within a preset frequency range without changing the resonating condition of the housing.

According to an aspect of the invention, a mass member is attached to a non-driving section of a driving motor for rotating a polygon mirror. It then becomes possible to avoid the resonation and to reduce vibration and noise by moving a resonance point by adding the mass member to the non-driving section.

For instance, it is possible to reduce the noise by attaching the mass member to a stationary shaft which is located at the center of rotation of the driving motor and which is considered to be the non-driving section.

The specific nature of the invention, as well as other objects, uses and advantages thereof, will clearly appear from the following description and from the accompanying drawings.

BRIEF DESCRIPTION OF THE DRAWINGS

Preferred embodiments of the present invention will be described in detail based on the following figures, wherein.

DESCRIPTION OF THE PREFERRED EMBODIMENTS

Figure 1:
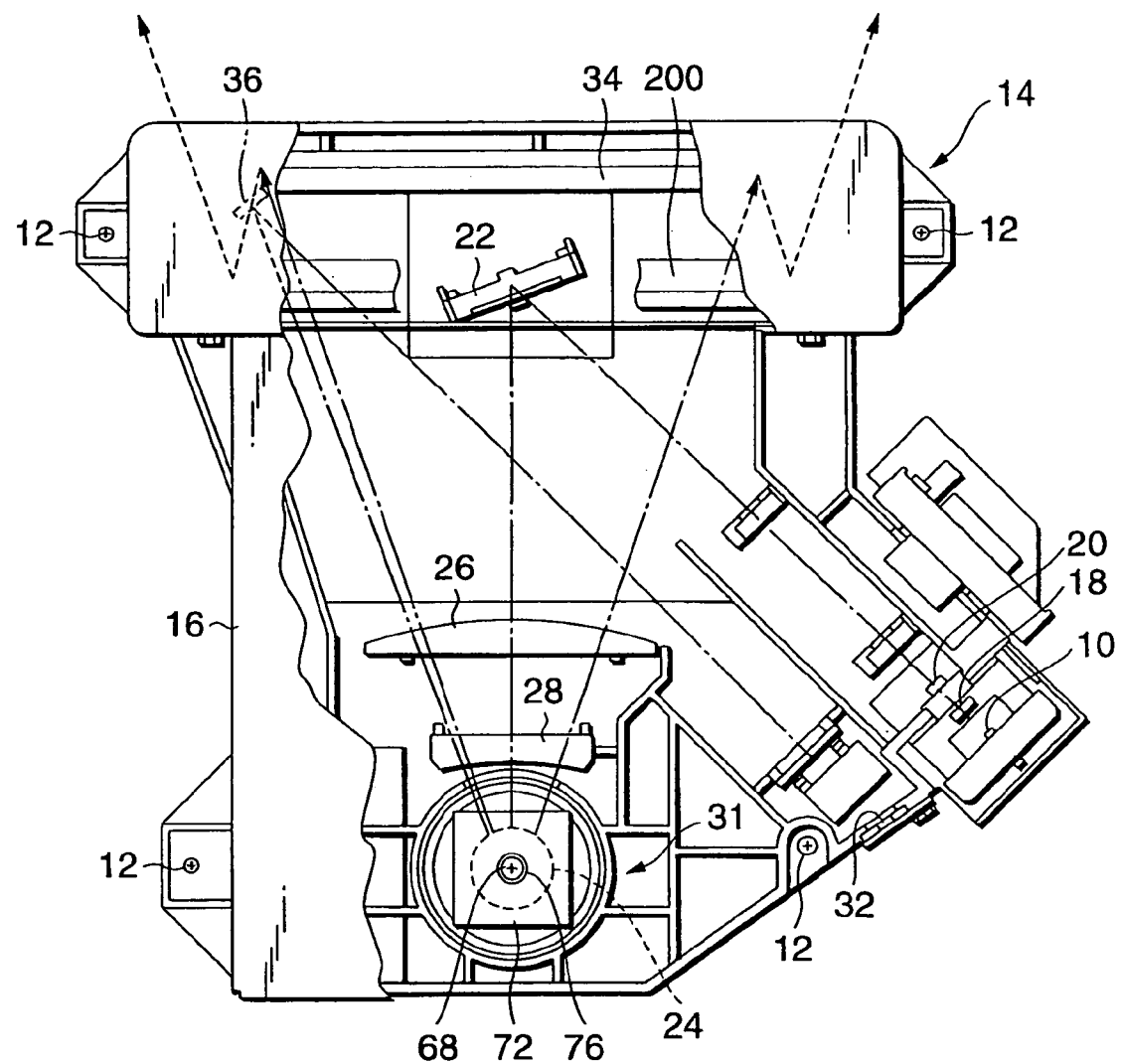
FIG. 1 is a plan view showing an optical scanning unit provided with a rotary deflector of a first embodiment.

An optical scanning unit provided with a rotary deflector of a first embodiment will be explained below with reference to the drawings.

(Schematic Structure of Optical Scanning Unit)

As shown in FIGS. 1 through 4, a housing 16 of the optical scanning unit 14 is formed of synthetic resin and is attached to a base 18 of an image forming apparatus by four fixing screws 12. The fixing points of the fixing screws 12 are always fixed and are not shifted depending on types of machine. Therefore, the amount and the mode of deformation of the housing 16 restricted by the fixing screws 12 are uniform and the position of the laser beam does not fluctuate per type of machine, thus causing no degradation of image quality.

An upper opening of the housing 16 is almost closed by a cover (not shown) and optical parts are stored in the concealed space.

In the optical system including such optical parts, a laser beam emitted out of a laser diode 10 is collimated by a collimator lens 18, shaped by a slit 20, reflected by a reflecting mirror 22 and arrives at a polygon mirror 24 composing a rotary deflector 31 via Fθ lenses 26 and 28. The polygon mirror 24 is a polygonal column having plural mirrors on the side faces thereof and is rotated at high speed by a driving motor 30.

The laser beam obtains a swing angle by being deflected by the polygon mirror 24, passes through the Fθ lenses 26 and 28 again, reflected by a mirror 34 and a cylindrical mirror 200, and performs scanning on a photoreceptor (not shown).

It is noted that a quantity of emission and emitting time of the laser diode 10 are controlled by a laser diode driver substrate. It modulates the laser diode 10 corresponding to image signals from the main body side to record an image on the photoreceptor.

Further, an SOS sensor 32 receives the laser beam reflected by a pickup mirror 36 disposed at the position before the image forming area of the photoreceptor, which is irradiated with the laser beam at first, to decide image writing timing.

Next, the rotary deflector will be explained.

Figure 2:
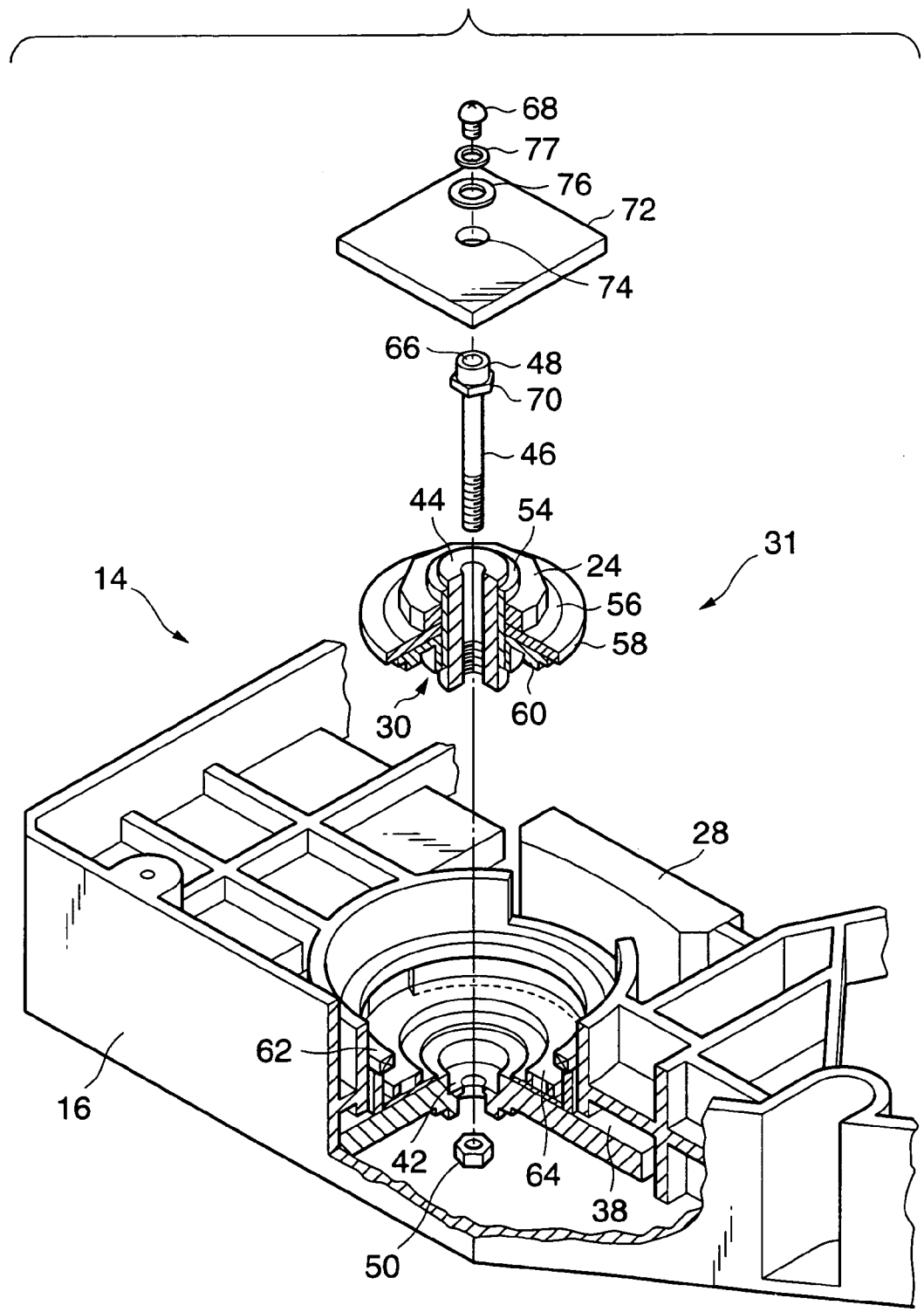
FIG. 2 is an exploded perspective view of the rotary deflector according to the first embodiment.
Figure 3:
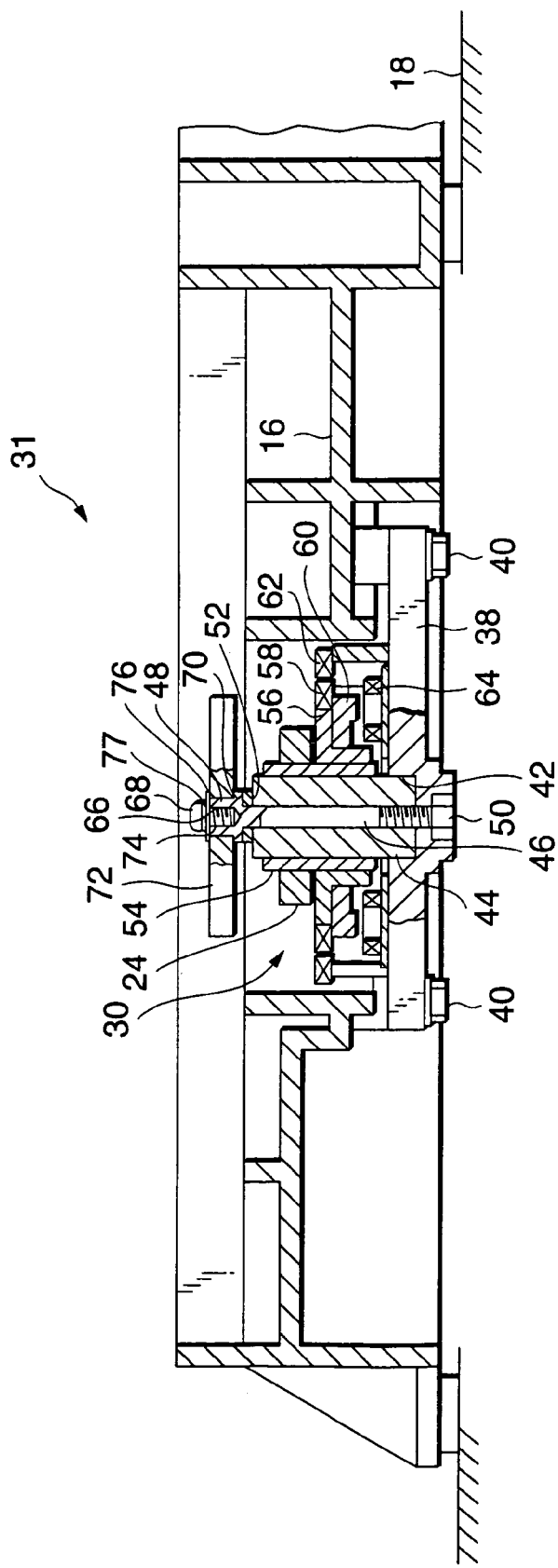
FIG. 3 is a sectional view of the rotary deflector of the first embodiment.
Figure 4:
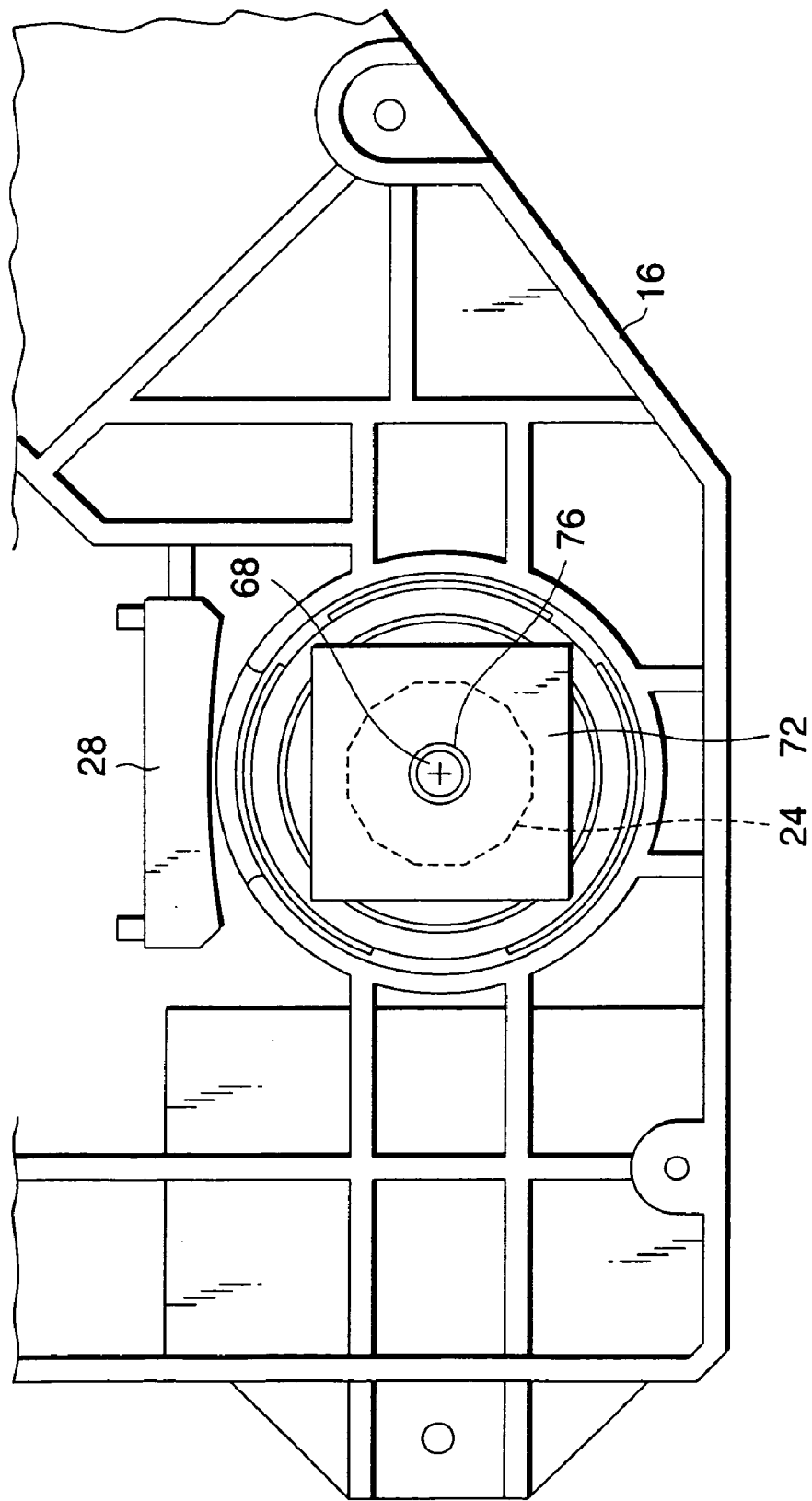
FIG. 4 is a plan view of the rotary deflector of the first embodiment.

As shown in FIGS. 2 and 3, a base plate 38 of the driving motor 30 provided in the rotary deflector 31 is fixed to the bottom of the housing 16 by fixing screws 40. A cylindrical stationary shaft 44 is fitted into a concave 42 formed at the center of the base plate 38 so as to stand straight.

A long screw 46 is inserted into a through hole of the stationary shaft 44. The long screw 46 penetrates the concave 42 and is screwed into a nut 50 fitted from the back of the base plate 38. Thereby, the stationary shaft 44 is fixed to the base plate 38 so as to stand straight from the top and bottom between the head 48 of the long screw 46 and the concave 42 via a washer 52.

A rotary sleeve 54 whose inner diameter is slightly larger than the outer diameter of the stationary shaft 44 is inserted into the stationary shaft 44 so as to be rotatable about the stationary shaft 44. It is noted that multiple dynamic pressure generating grooves (not shown) are formed on the outer peripheral face of the stationary shaft 44 at a slant to the axial direction by a certain angle.

A flange 56 is attached to the rotary sleeve 54 and the polygon mirror 24 is attached to the flange 56 coaxially with the rotary sleeve 54.

The flange 56 is provided with a thrust bearing magnet 58 and a driving magnet 60. A magnetic material 62 is disposed on the base plate 38 so as to face to the side of the thrust bearing magnet 58 so that the rotary sleeve 54 does not move up and down by its magnetic action. A driving coil 64 is disposed on the base plate 38 to rotate the polygon mirror 24 at predetermined rotational speed by generating repulsive force and attractive force between the driving magnet 60 and the driving coil 64 by supplying alternating current whose phase is shifted.

Meanwhile, a screw hole 66 is formed at the axial center of the head 48 of the long screw 46 so as to be able to screw in a fixing screw 68. A step 70 is formed around the periphery of the head 48 so as to support a mass member 72 when an attaching hole 74 formed at the center of gravity of the mass member 72 is inserted into the head 48. That is, the mass member 72 may be fixed to the head 48 of the stationary shaft 44 by the fixing screw 68 via a washer 76 and a spring washer 77 without disassembling the stationary shaft 44. Therefore, it is possible to attach/remove the mass member having different mass in response to fluctuation of vibrating frequency and to realize a low noise and high image quality image forming apparatus by suppressing the vibration of the base 18 in a target frequency range.

The mass member 72 is formed of a square iron plate so as to be able to obtain the necessary mass with a small volume. The mass member 72 is symmetrical centering on the center of gravity thereof and its deflection from the center of gravity is constant. Also, the stationary shaft 44 will not fall when the mass member 72 is attached to the stationary shaft 44, by causing the center of gravity of the mass member 72 to coincide with the center of axis of the stationary shaft 44.

The mass member 72 may also be inserted into the hollow section of the stationary shaft 44 instead of fixing it at the head 48 of the stationary shaft 44.

Figure 5:
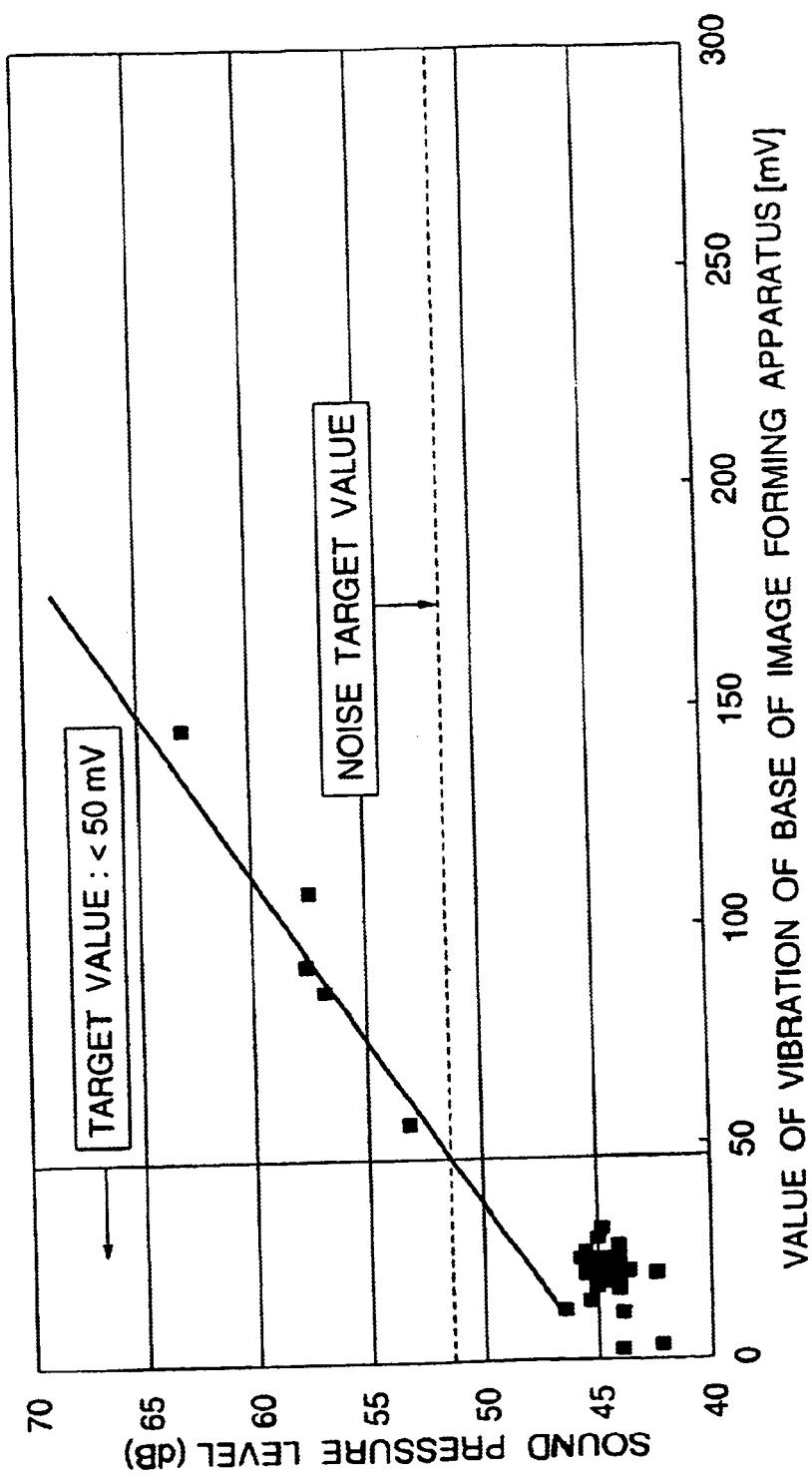
FIG. 5 is a graph showing the relationship between vibration of a base and noise.

FIG. 5 shows the relationship between the vibration level of the base 18 and noise when the optical scanning unit 14 in which the mass member 72 (mass: 50 g) is attached to the stationary shaft 44 is mounted on the base 18 of the image forming apparatus. Here, the value of vibration (mV) is what acceleration is transformed into voltage and 1000 mV=9.8 m/s² (acceleration).

While the vibration of the base 18 is caused by transmission of an exciting force due to unbalance of the driving motor 30 via the housing 16 of the optical scanning unit 14, the sound pressure level may be lowered to 52 dB or less and noise may be reduced by reducing the value of vibration to 50 mV or less.

It is thus possible to reduce the level of vibration and to reduce the noise by avoiding the resonation by moving the resonance point by attaching the mass member 72 to the stationary shaft 44 of the driving motor 30 in this embodiment.

Figure 6:
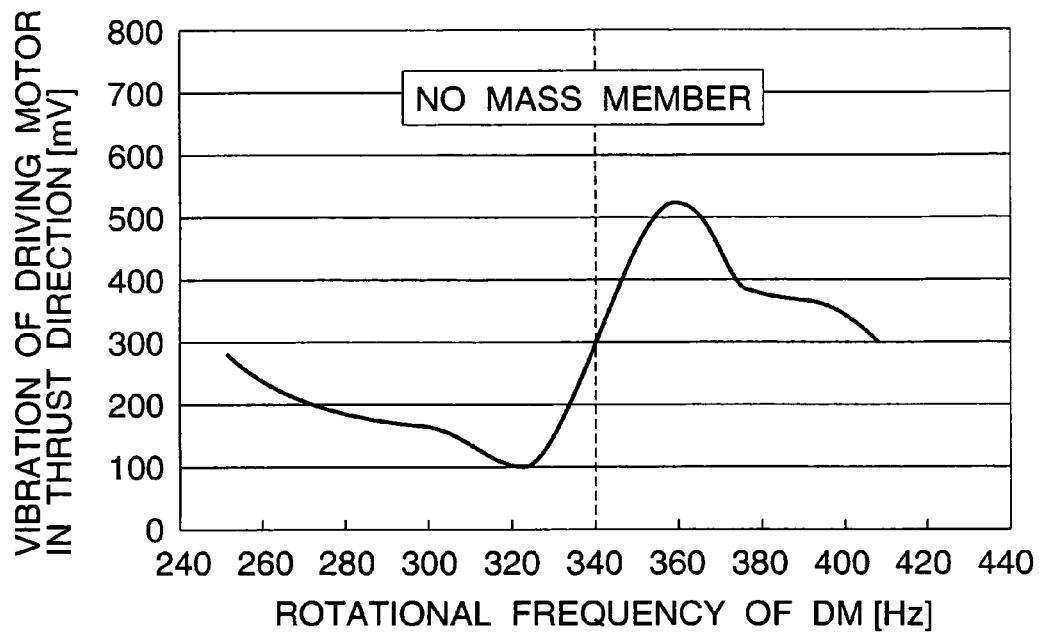
FIG. 6 is a graph showing the vibration level of a driving motor when no mass member is attached.
Figure 7:
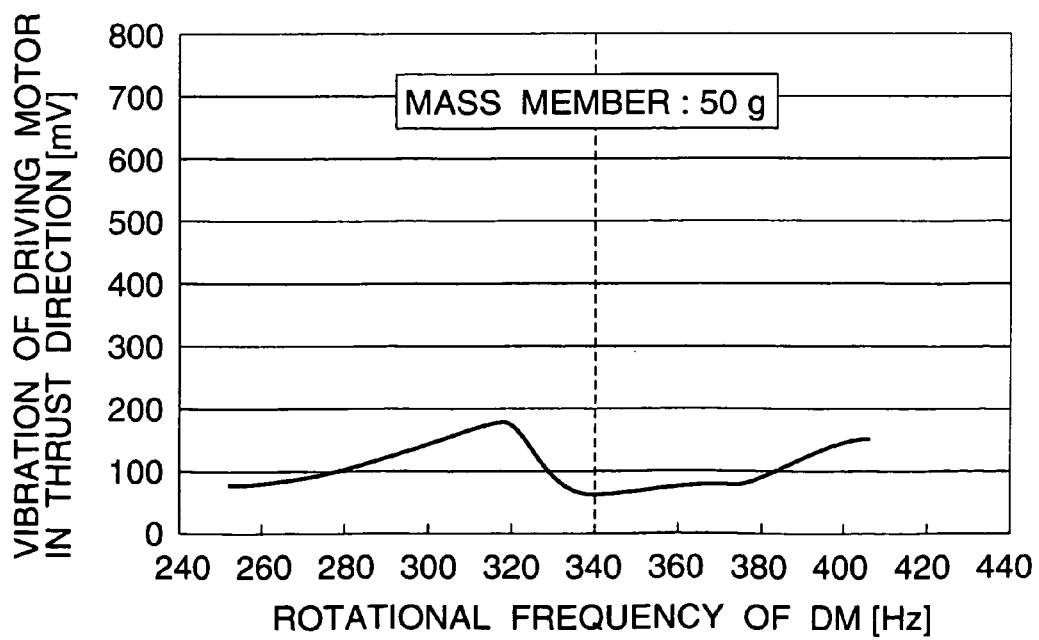
FIG. 7 is a graph showing the vibration level of the driving motor when the mass member is attached.

FIGS. 6 and 7 show the result of comparison of vibration levels in the case where the mass member 72 is not attached and in the case where it is attached. The vibration in the vertical direction (the thrust direction of the stationary shaft 44) was measured at the fixing section of the base plate 38 of the rotary deflector 31 as the measuring point.

Then, the vibration level was measured by changing the rotational speed of the driving motor 30 from 250 Hz to 400 Hz. As a result, while the vibration level was 300 mV when there was no mass member as shown in FIG. 6 when the rotational speed was 340 Hz in forming an image, it was reduced to 65 mV when the mass member was attached. Thus, it was possible to prevent noise from occurring in switching the speed of the rotary deflector.

Figure 8:
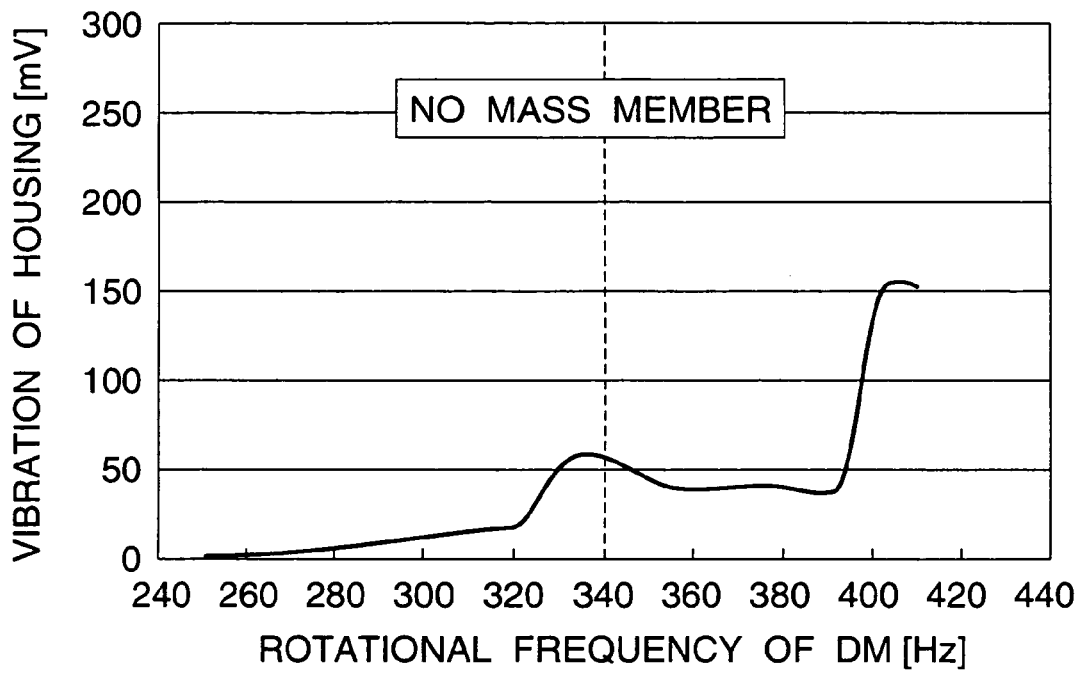
FIG. 8 is a graph showing the vibration level of the housing when no mass member is attached.
Figure 9:
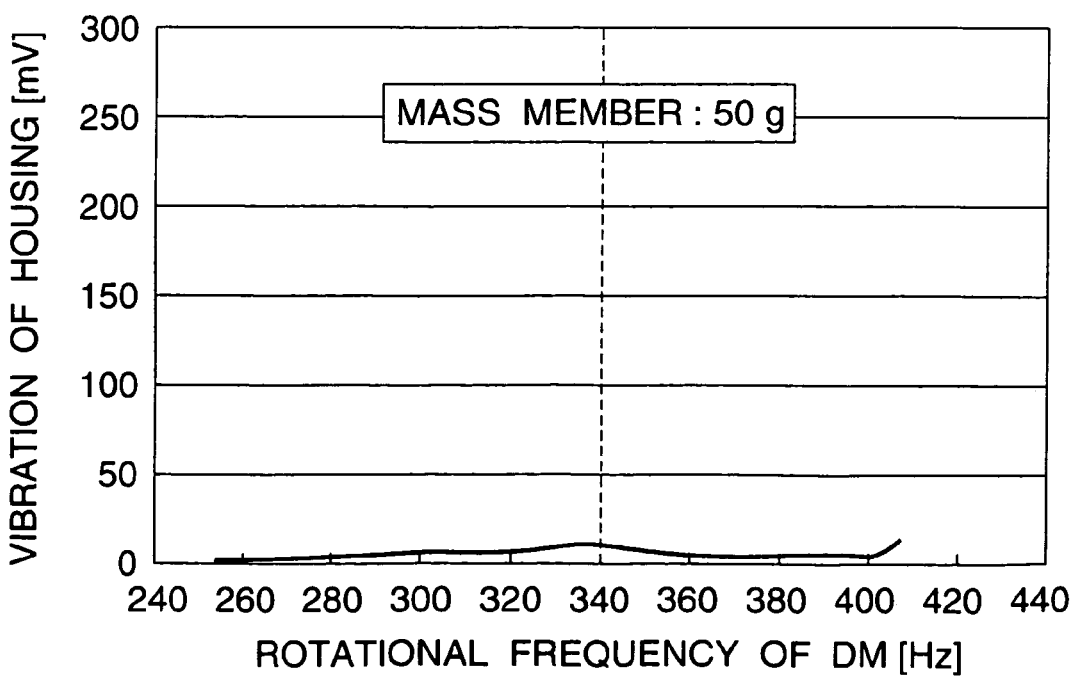
FIG. 9 is a graph showing the vibration level of the housing when the mass member is attached.

The image forming apparatus of this embodiment is a printer which is adaptable to two kinds of resolution of 600 DPI and 480 DPI. The rotational speed of the polygon mirror 24 in printing in 600 DPI is 340 cycles per second and the rotational speed of the polygon mirror 24 in printing in 480 DPI is 272 cycles per second. Graphs in FIGS. 8 and 9 show the result in the range of rotational speed in use (272 Hz to 340 Hz). When the vibration at the center of the housing 16 was measured, the vibration level was reduced to 10 mV when the mass member was attached as compared to the case of 60 mV in maximum when no mass member was attached.

Figure 10:
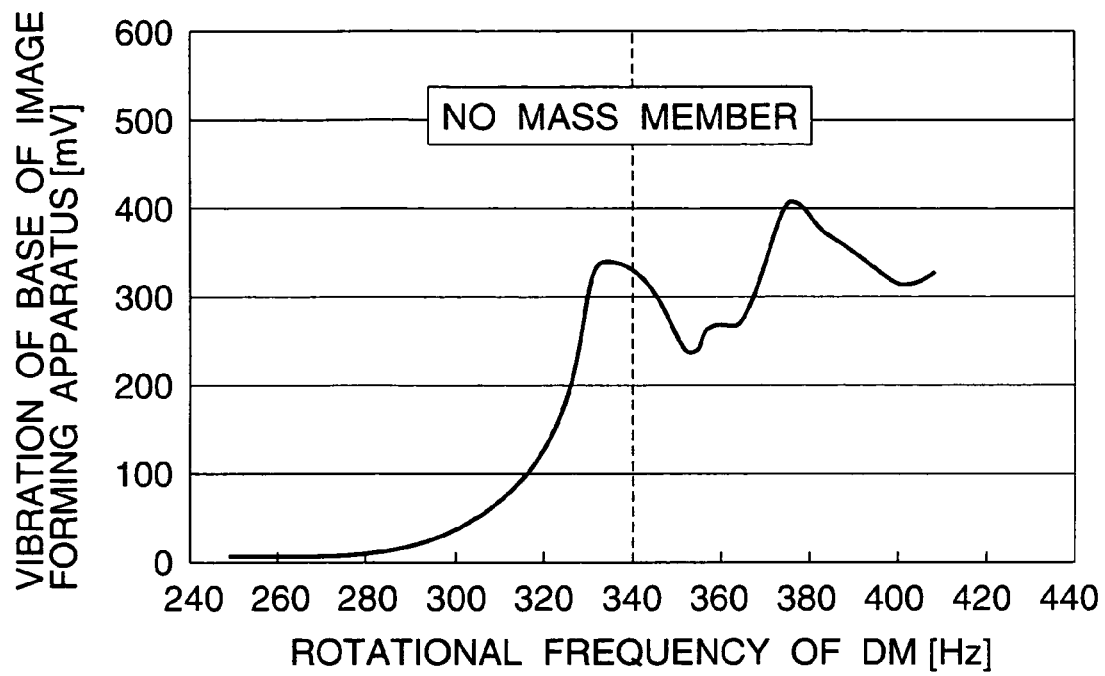
FIG. 10 is a graph showing the vibration level of the base when no mass member is attached.
Figure 11:
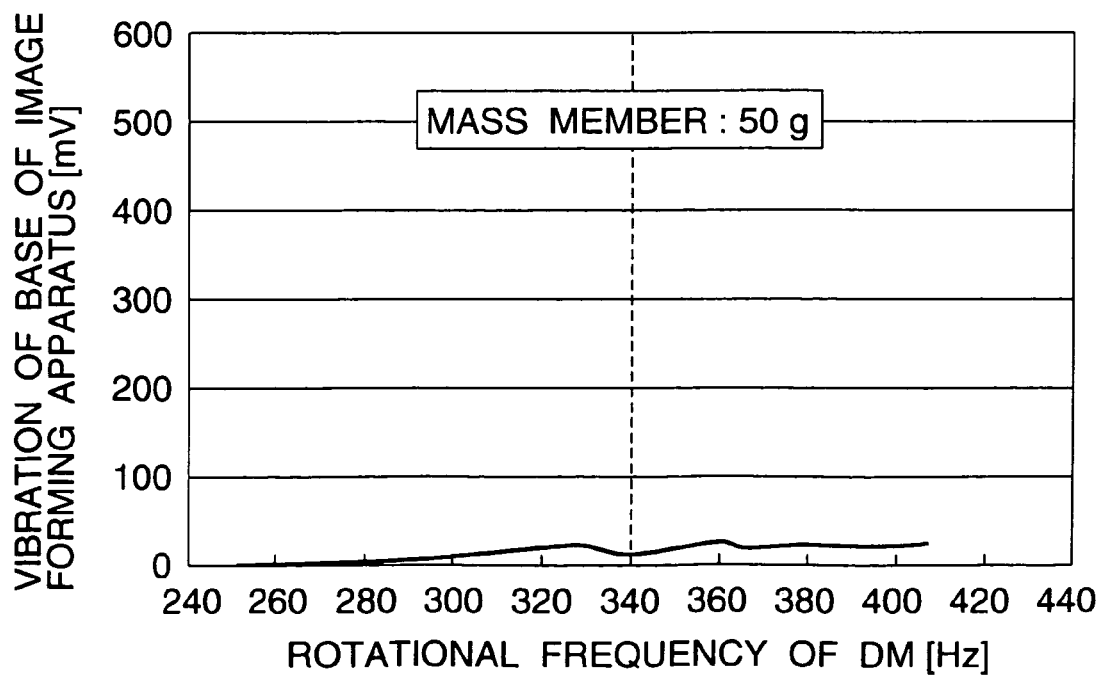
FIG. 11 is a graph showing the vibration level of the base when the mass member is attached.

FIGS. 10 and 11 show the comparison of vibration levels of the base 18. The measuring point was the center of four fixing points where the housing 16 shown in FIG. 1 is fixed by the fixing screws 12. While the vibration level was 340 mV in maximum when no mass member was attached, it was reduced to 20 mV when the mass member was attached.

The unbalance of the driving motor 30 used in the rotary deflector of this embodiment conforms to a specification requiring G2 (JISB0905: grade of balance of rotary device).

Figure 12:
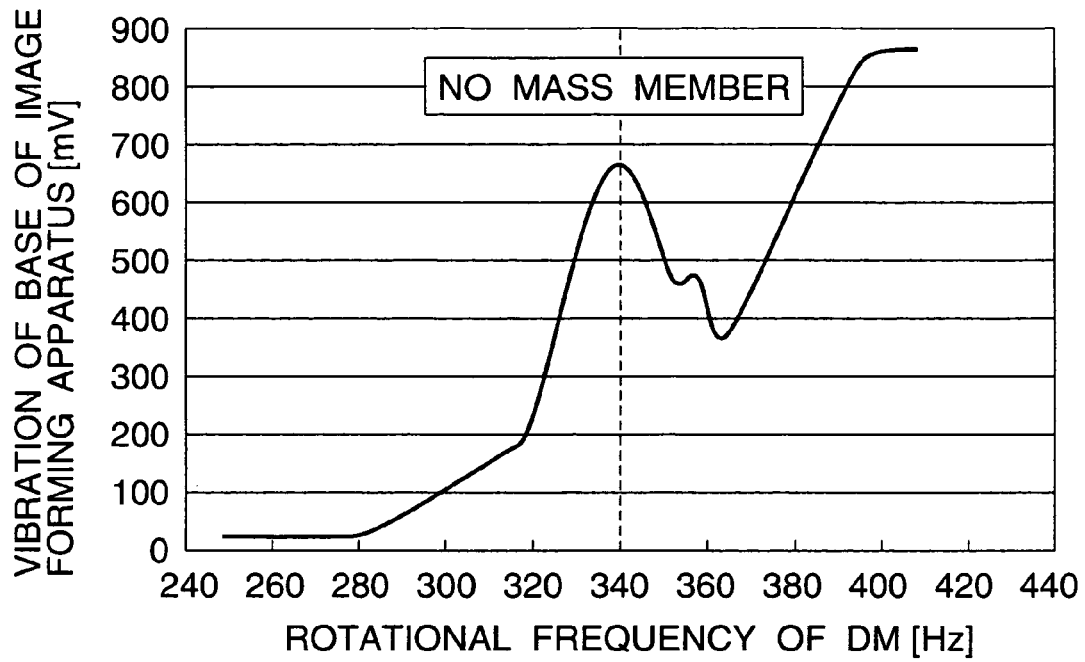
FIG. 12 is a graph showing the vibration level of the base when a quantity of unbalance of the driving motor is increased and no mass member is attached.
Figure 13:
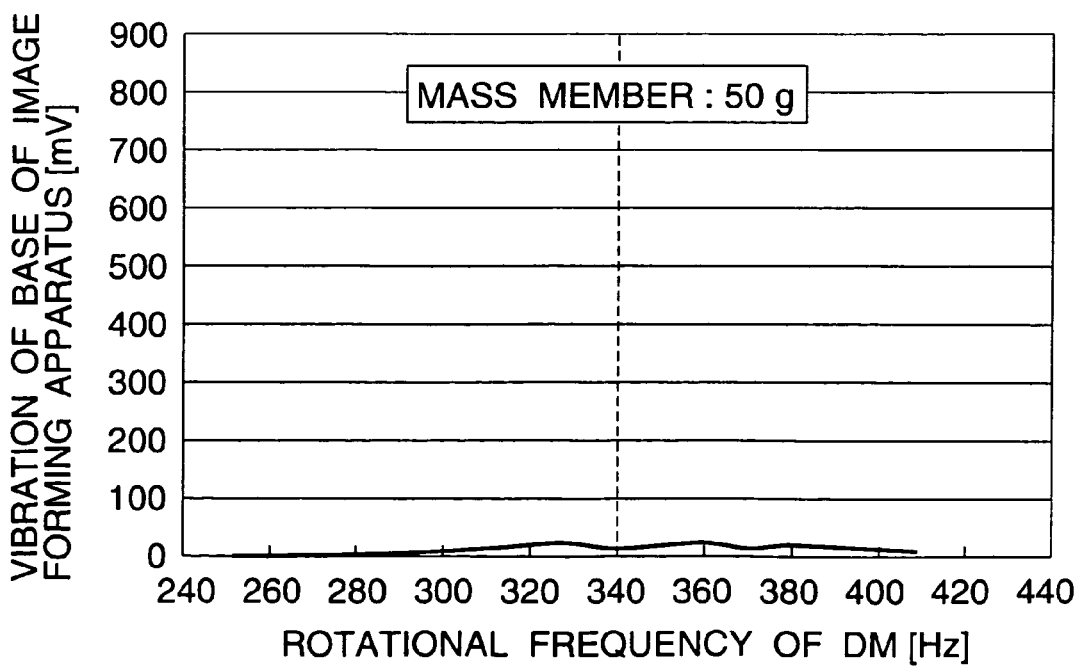
FIG. 13 is a graph showing the vibration level of the base when a quantity of unbalance of the driving motor is increased and the mass member is attached.

FIGS. 5 through 11 show the results of measuring the unbalance of the driving motor 30 confirmed on the level of G2. Graphs in FIGS. 12 and 13 show the results of measuring the vibration of the base 18 when the degree of unbalance of the driving motor 30 is intentionally increased to G6.

According to this measured result, while the vibration level was 680 mV in maximum when no mass was attached, it was reduced to 20 mV or less when the mass member was attached and the unbalance was reduced to the level of G2. Thus, the vibration does not change due to a drift of balance, so that it is possible to realize low vibration design in a short time, improving the reliability.

Although most of the unbalance of the driving motor of mass-produced products is normally controlled in the level of G1 through G3, it is possible to considerably relax balance specifications, to reduce balancing processes and to reduce the cost considerably.

Next, the relationship between the mass of the mass member and the resonance frequency will be explained.

Figure 14:
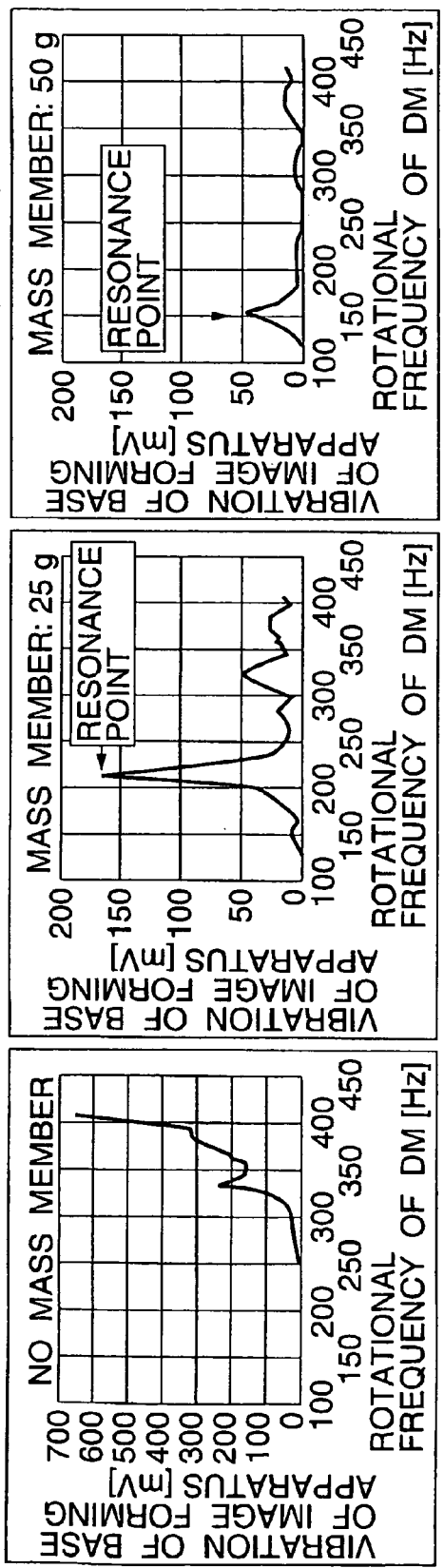
FIGS. 14A through 14F are graphs showing the relationship between the mass of the mass member and the vibration level of the base.

The resonance point moves downward stepwise, as shown in FIG. 14A in which the resonance point is 400 Hz when no mass member is attached, in FIG. 14B in which the resonance point is 220 Hz when the mass member is 25 g, in FIG. 14C in which the resonance point is 155 Hz when the mass member is 50 g, in FIG. 14D in which the resonance point is 140 Hz when the mass member is 65 g, in FIG. 14E in which the resonance point is 130 Hz when the mass member is 75 g, and in 14F in which the resonance point is 110 Hz when the mass member is 85 g.

Thus, it becomes possible to achieve optimal tuning to lower the vibration per type of machine and to be readily adaptable to other type machines just by selecting the mass of the mass member.

Figure 15:
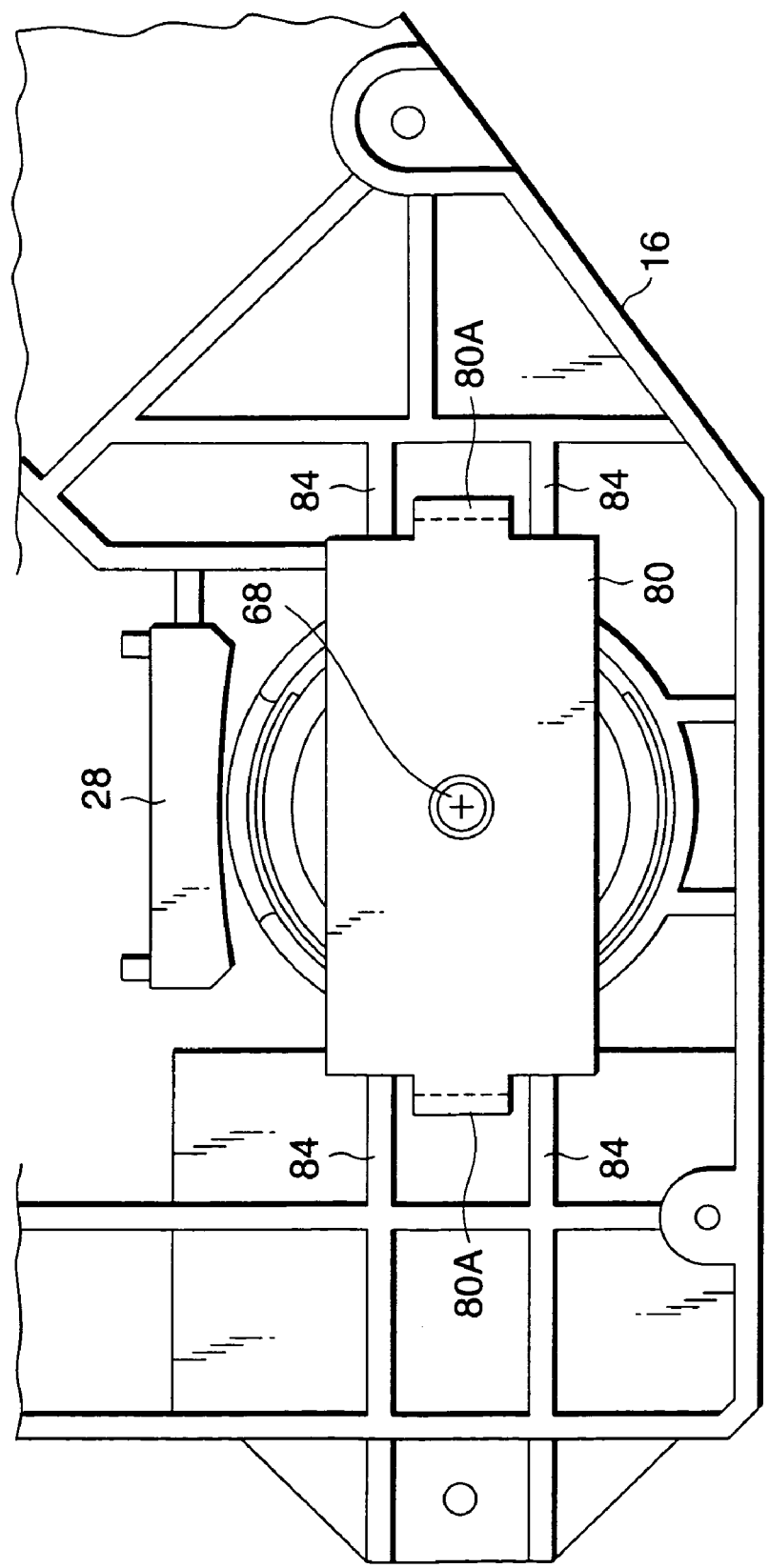
FIG. 15 is a plan view of a rotary deflector according to a second embodiment.
Figure 16:
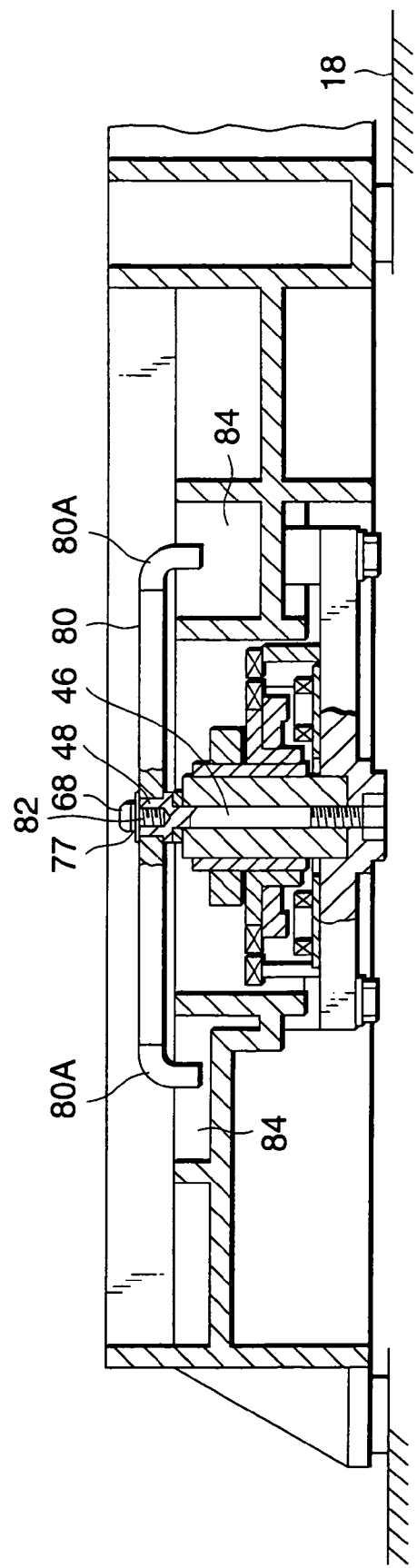
FIG. 16 is a sectional view of the rotary deflector of the second embodiment.

FIGS. 15 and 16 show a rotary deflector of a second embodiment.

A mass member 80 is formed of a rectangular iron plate. An attaching hole 82 formed at the center of gravity of the plate is inserted into the head 48 of the long screw 46 and is fixed by the fixing screw 68. Hook pieces 80A are bent downward at both ends of the mass member 80 in the longitudinal direction and are positioned between ribs 84 for reinforcing the housing 16. Even if the fixing screw 68 for fixing the mass member 80 becomes loose due to vibration, the ribs 84 intervene the hook pieces 80A to stop the rotation of the mass member 80 structurally.

It is noted that while a spring washer 77 is used as a measure for preventing the fixing screw 8 from being loosened, a hook 80A is also provided so that it hits against a rib 84 and stops rotation of the mass member, thus damaging no other optical parts, even when it so happens that the mass member 80 is loosened while shipping the image forming apparatus. Further, because the degree of rotation before hitting against the rib 84 is very small and the pressure of the spring washer 77 is fully high, it is possible to keep the stable state unless an abnormality occurs.

When the mass member 80 of 75 g is attached to a copying machine whose resolution is 600 DPI, rotational speed of the rotary deflector is 340 rps and rotational speed during the standby state is 170 rps, it is possible to reduce vibration of 170 Hz to 340 Hz.

Next, the relationship between the weight balance of the mass member and the vibration level of the base will be explained.

Figure 17A:
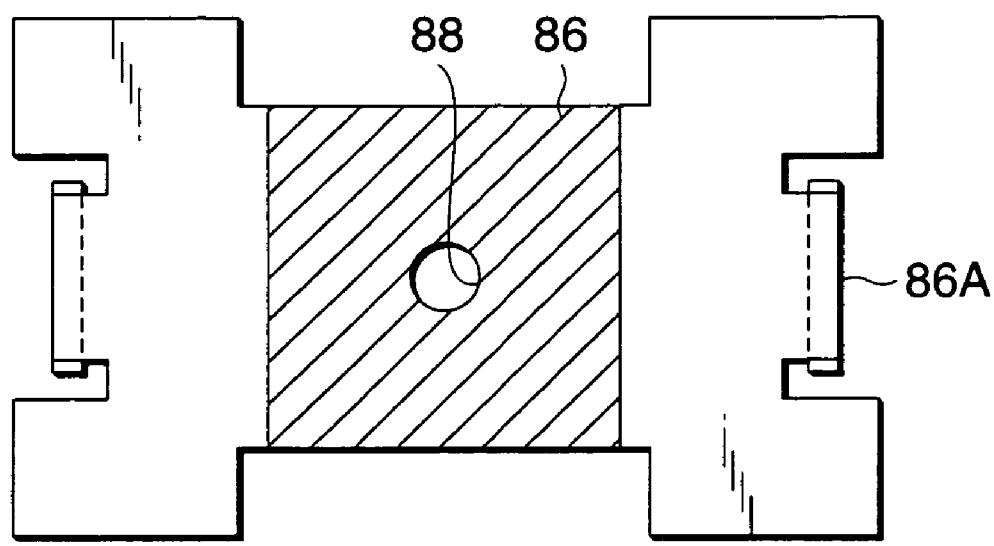
FIG. 17A is a plan view showing a modified example in which the balance of weight of the mass member is changed and FIG. 17B is a sectional view showing the modified example in which the balance of weight of the mass member is changed.
Figure 17B:
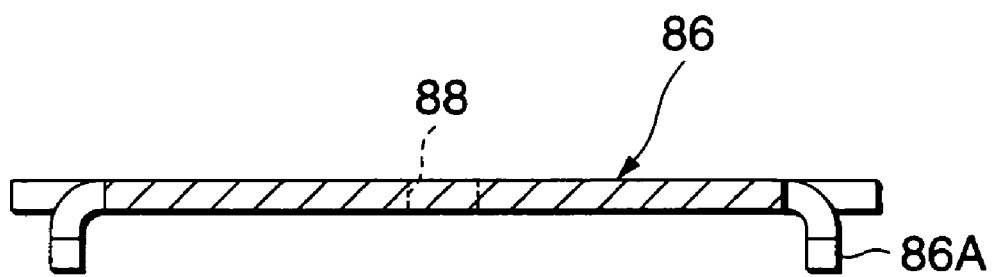
Figure 18A:
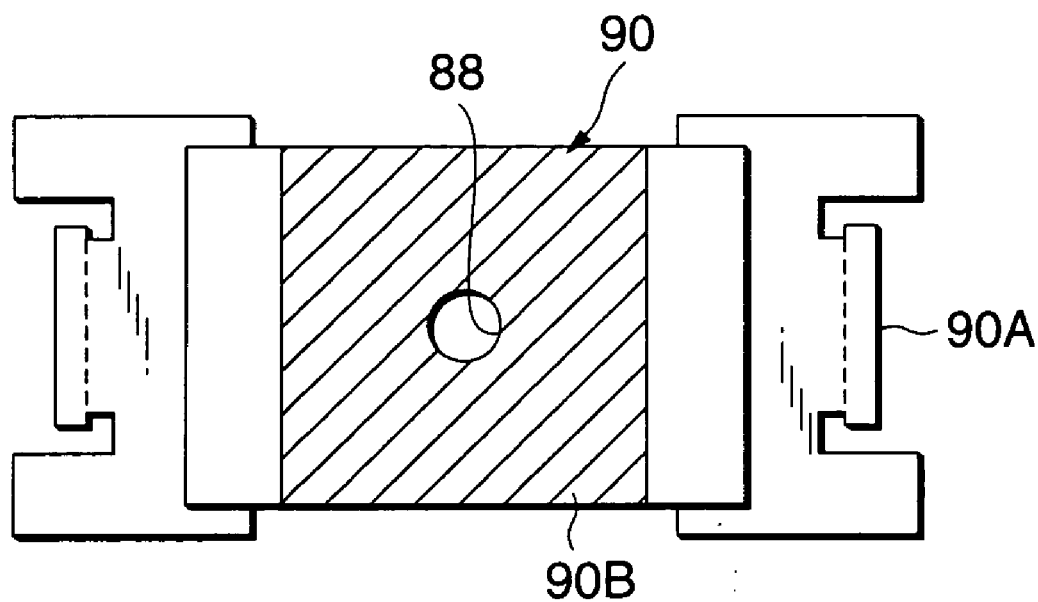
FIG. 18A is a plan view showing a modified example in which the balance of weight of the mass member is changed and FIG. 18B is a sectional view showing the modified example in which the balance of weight of the mass member is changed.
Figure 18B:
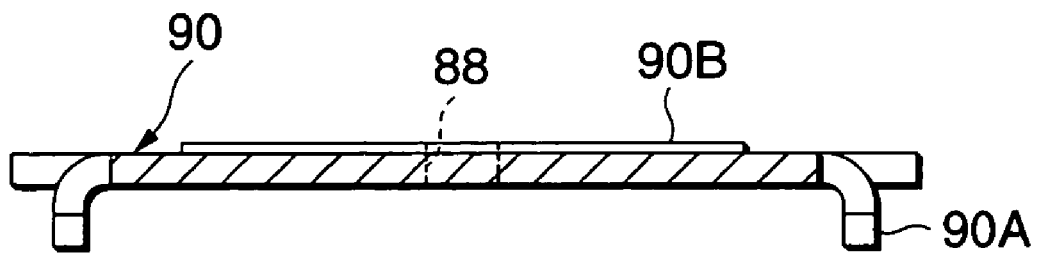

In a mass member 86 shown in FIG. 17, the ratio of weight of an area (hatched part) of 35 mm×35 mm centering on an attachment hole 88 to the whole mass of 75 g is set at 33%. In a mass member 90 shown in FIG. 18, a thin plate 90B is pasted at the center part to set the ratio of weight of the area of 35 mm×35 mm centering on the attachment hole 88 to the whole mass of 75 g at 46%.

Figure 19A:
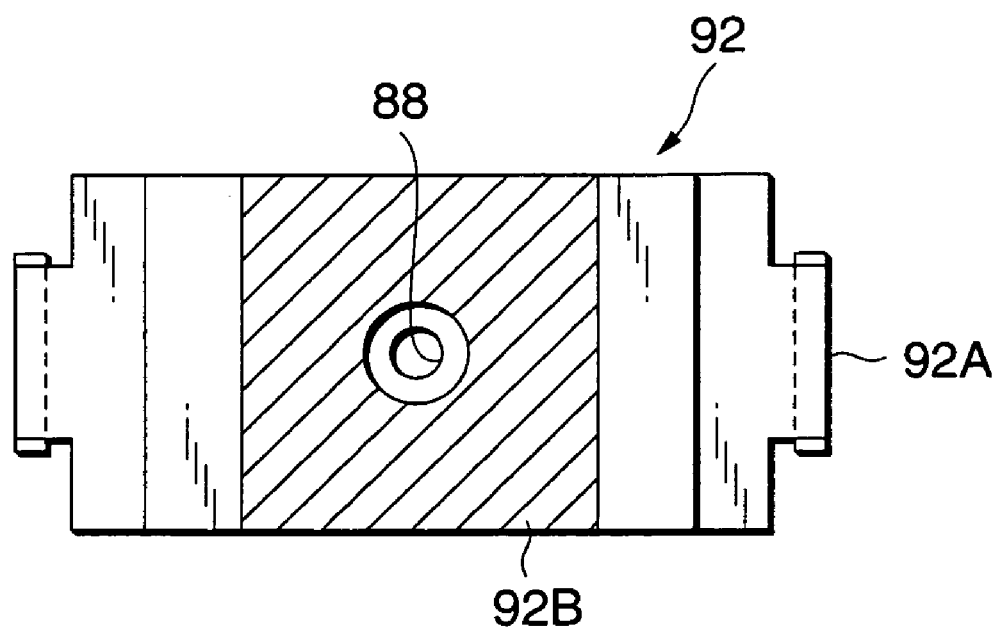
FIG. 19A is a plan view showing a modified example in which the balance of weight of the mass member is changed and FIG. 19B is a sectional view showing the modified example in which the balance of weight of the mass member is changed.
Figure 19B:
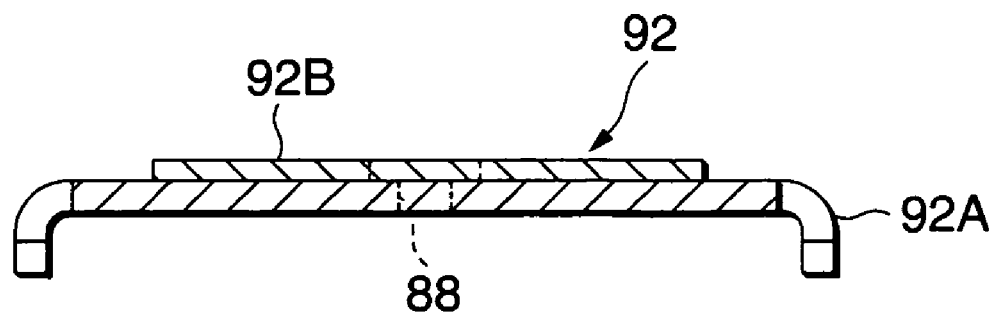
Figure 20:
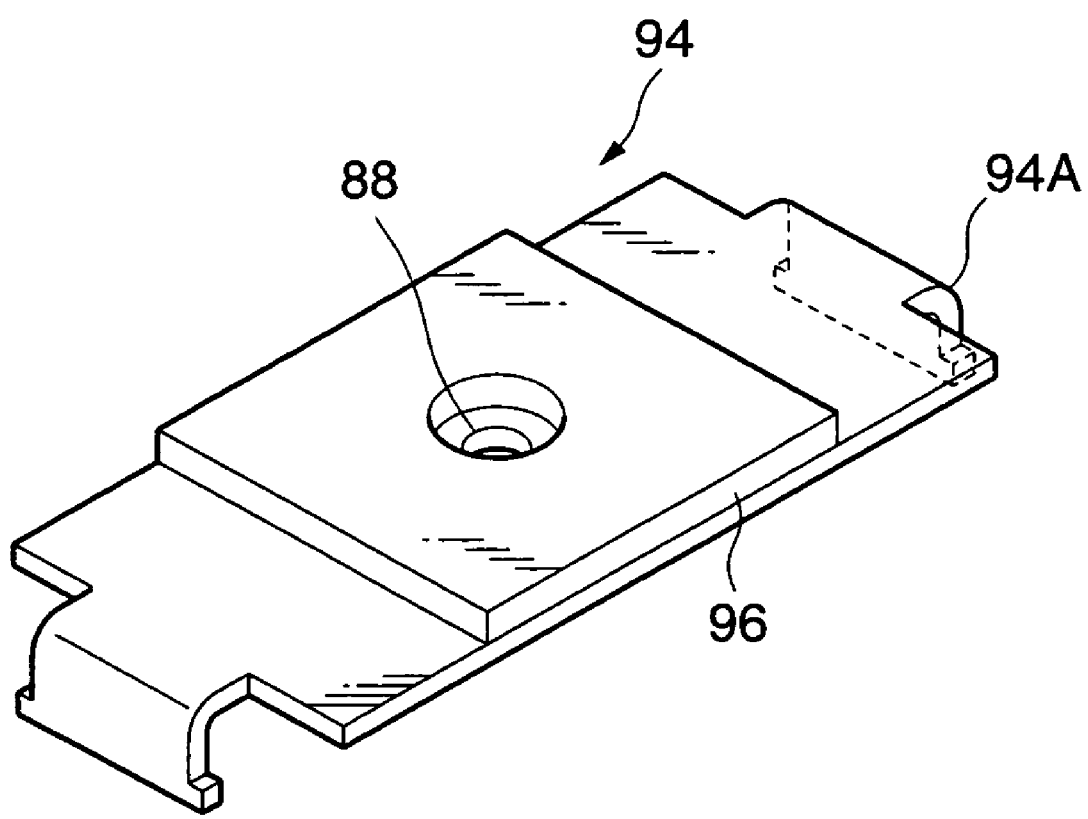
FIG. 20 is a perspective view showing the modified example in which the balance of weight of the mass member is changed.
Figure 21A:
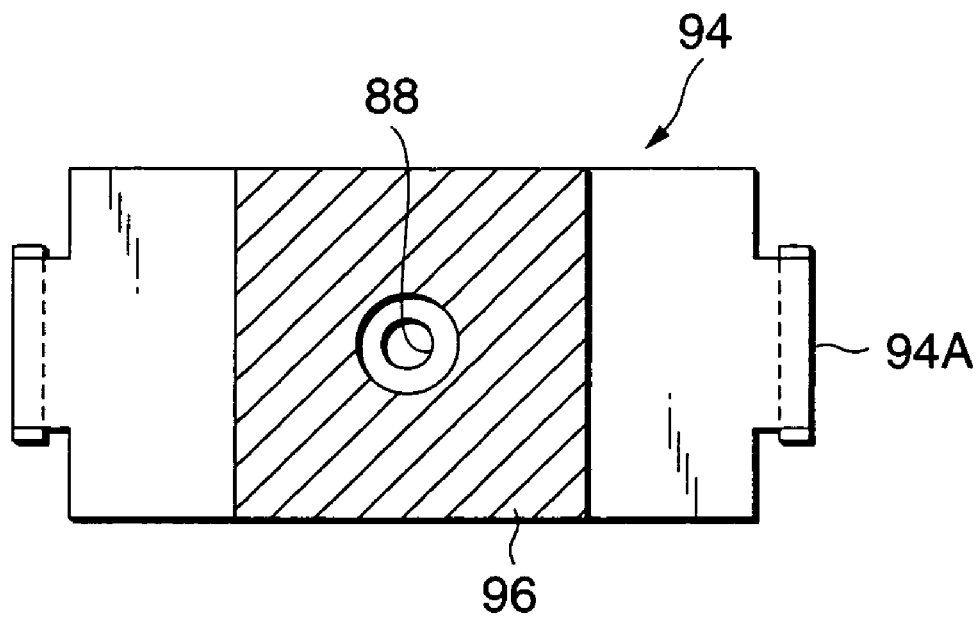
FIG. 21A is a plan view showing a modified example in which the balance of weight of the mass member is changed and FIG. 21B is a sectional view showing the modified example in which the balance of weight of the mass member is changed.
Figure 21B:
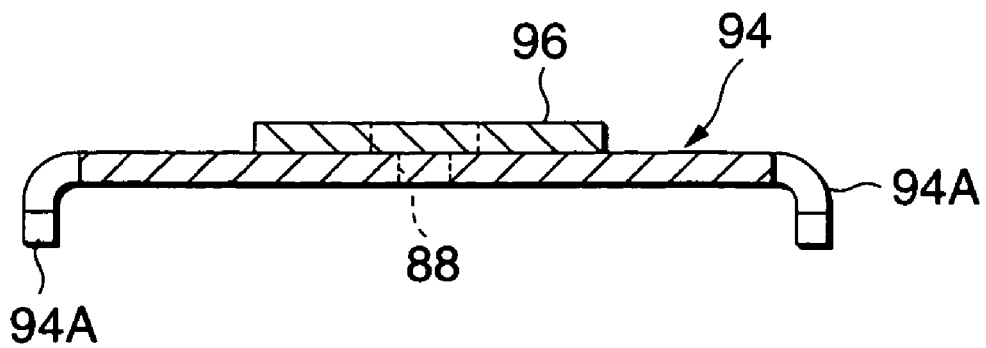

In a mass member 92 shown in FIG. 19, a plate member 92B is pasted at the center part to set the ratio of weight of the area of 35 mm×35 mm centering on the attachment hole 88 to the whole mass of 75 g at 57%. In a mass member 94 shown in FIGS. 20 and 21, a thick plate 96 is pasted at the center part to set the ratio of weight of the area of 35 mm×35 mm centering on the attachment hole 88 to the whole mass of 75 g at 66% to concentrate the weight further.

Figure 22:
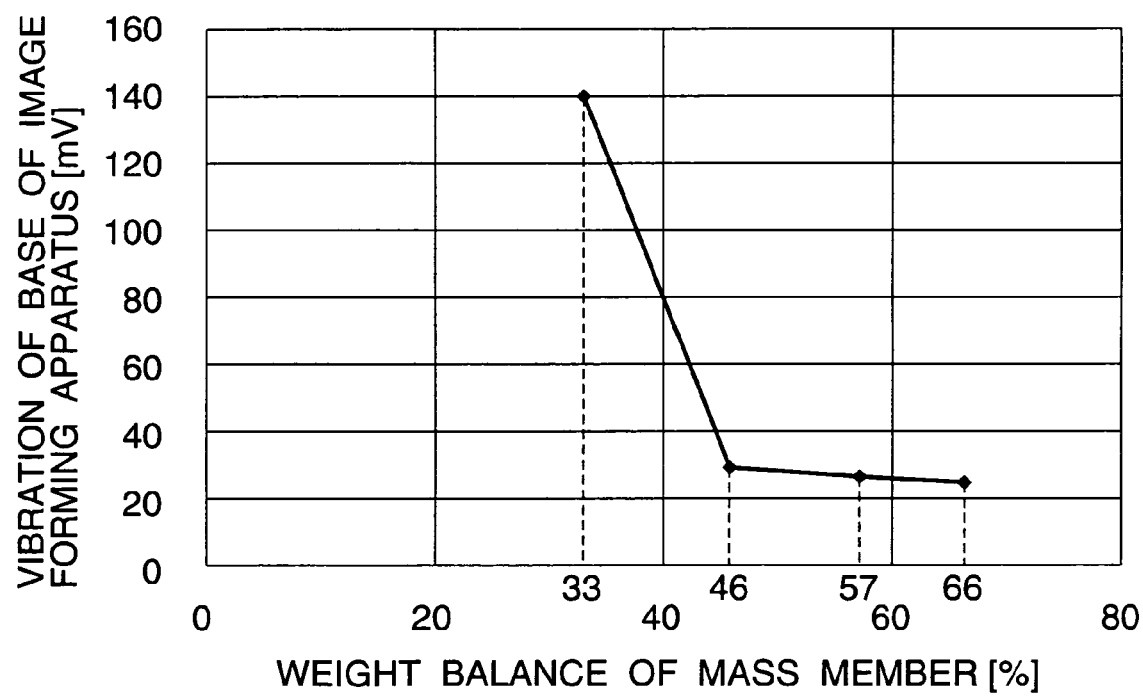
FIG. 22 is a graph showing the relationship between weight balance of the mass member and the vibration level of the base.

It is thus possible to reduce the vibration level of the base 18 by concentrating the ratio of weight of the mass member on the axial center of the stationary shaft as it may be judged from a graph shown in FIG. 22. It is noted that this experimental result shows maximum values in the range of the rotational frequency in use of 170 Hz to 340 Hz and the vibration level is stabilized by concentrating the weight ratio to 46% or more. However, when the weight ratio is concentrated up to 57%, no problem occurs even when there is dispersion (3% in maximum) due to mass-production. It is noted that the mass members 86, 90, 92 and 94 are provided with hooks 86A, 90A, 92A and 94A whose rotation is stopped by the rib 84 of the housing 16.

Figure 23:
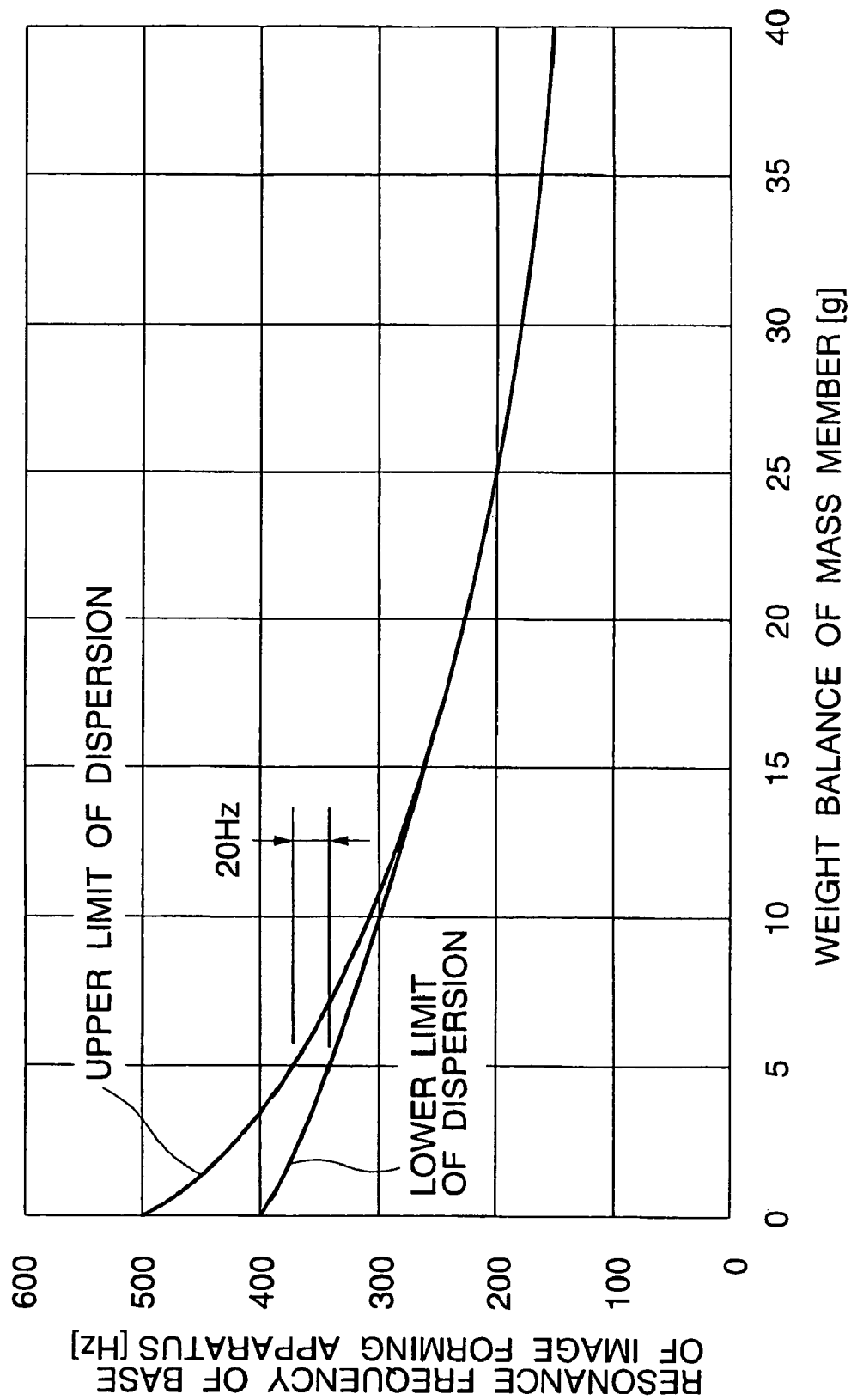
FIG. 23 is a graph showing the relationship between the mass of the mass member and the resonance point.

FIG. 23 shows the relationship between the mass of the mass member and the resonance point.

As it is apparent from FIG. 23, the dispersion of the resonance point of the base 18 is reduced to 20 Hz or less and the effect of the present invention may be brought about by increasing the mass of the mass member to 5 g or more.

Figure 24:
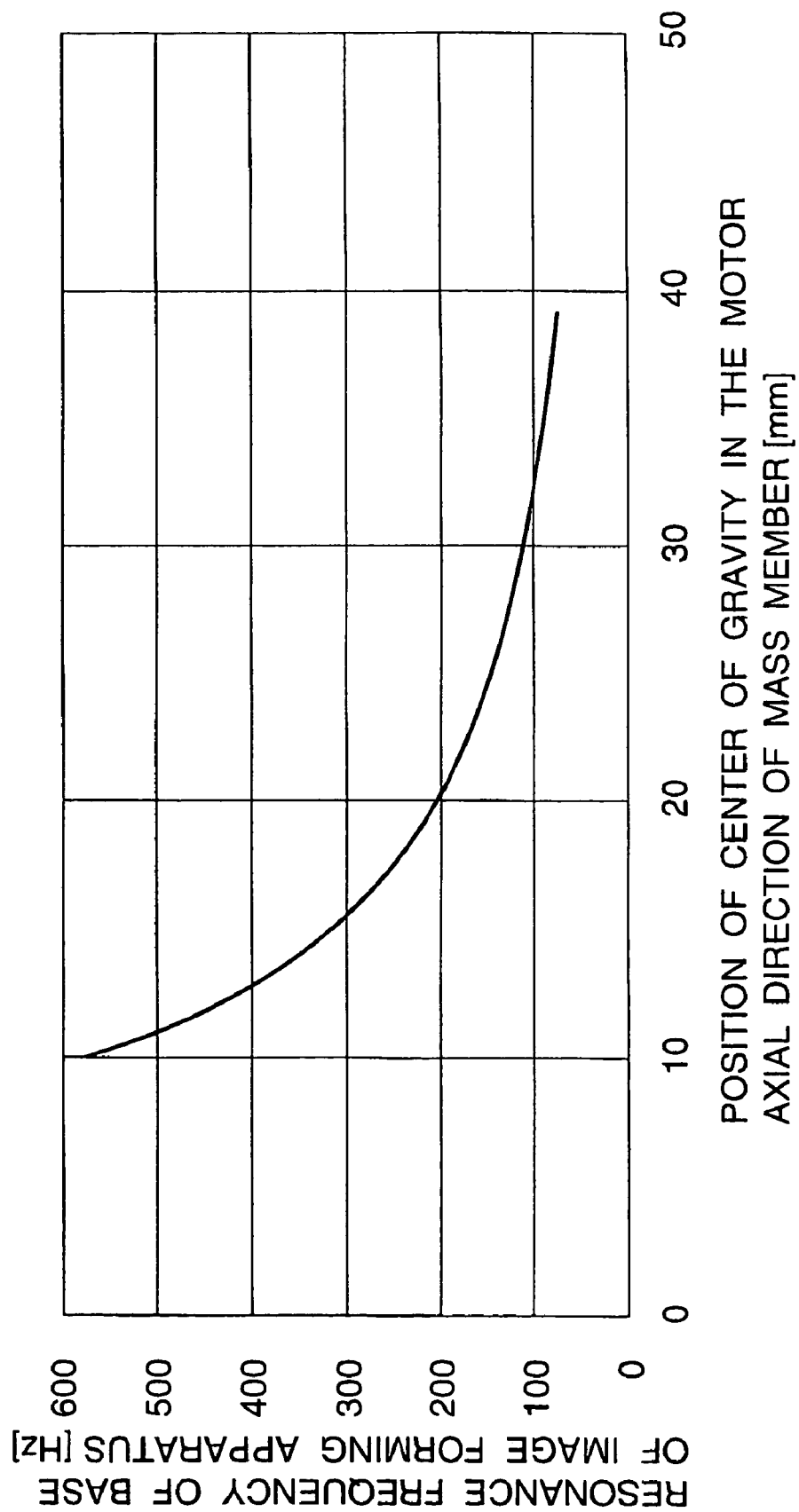
FIG. 24 is a graph showing the relationship between the position of center of gravity and the resonance frequency of the base.

FIG. 24 shows the relationship between the gravitational position of the mass member acting in the axial direction of the driving motor and the resonance frequency of the base. As shown in the graph, the gravitational position of the mass member is also one of important parameters deciding the resonance point.

Next, a rotary deflector of a third embodiment will be explained.

Figure 25:
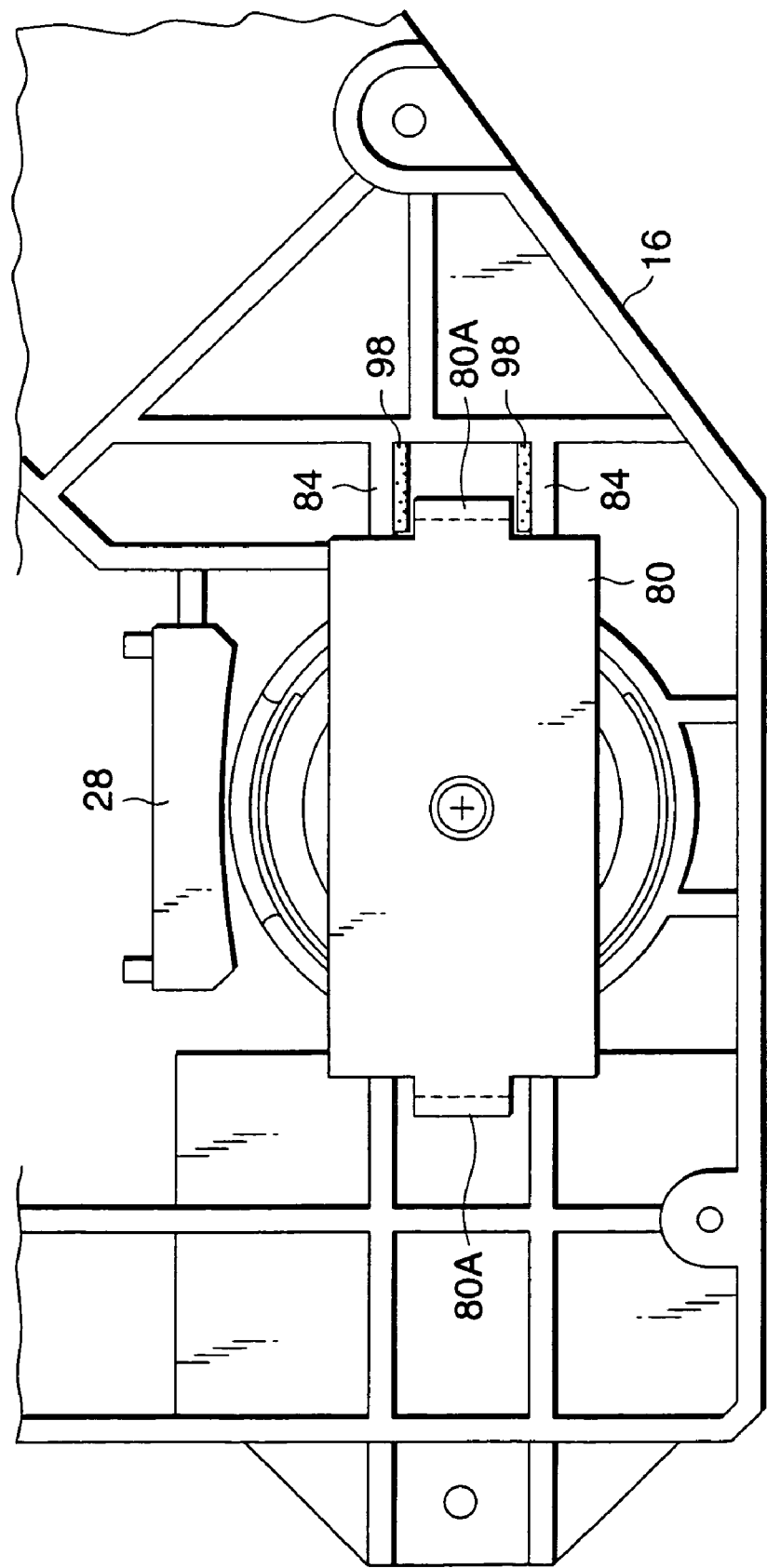
FIG. 25 is a plan view of a rotary deflector according to a third embodiment.
Figure 26:
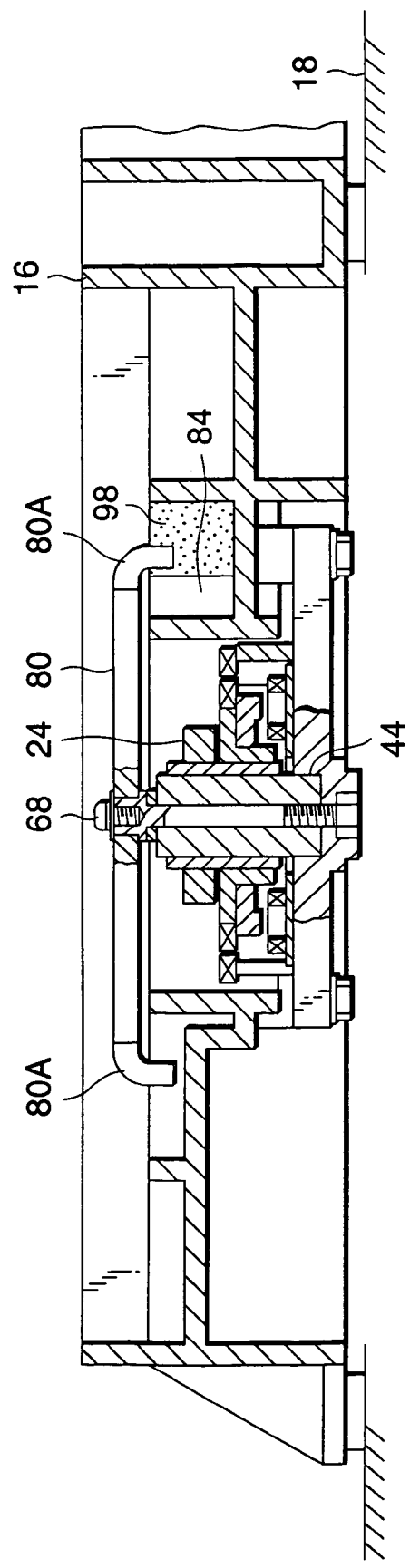
FIG. 26 is a sectional view of the rotary deflector of the third embodiment.
Figure 27:
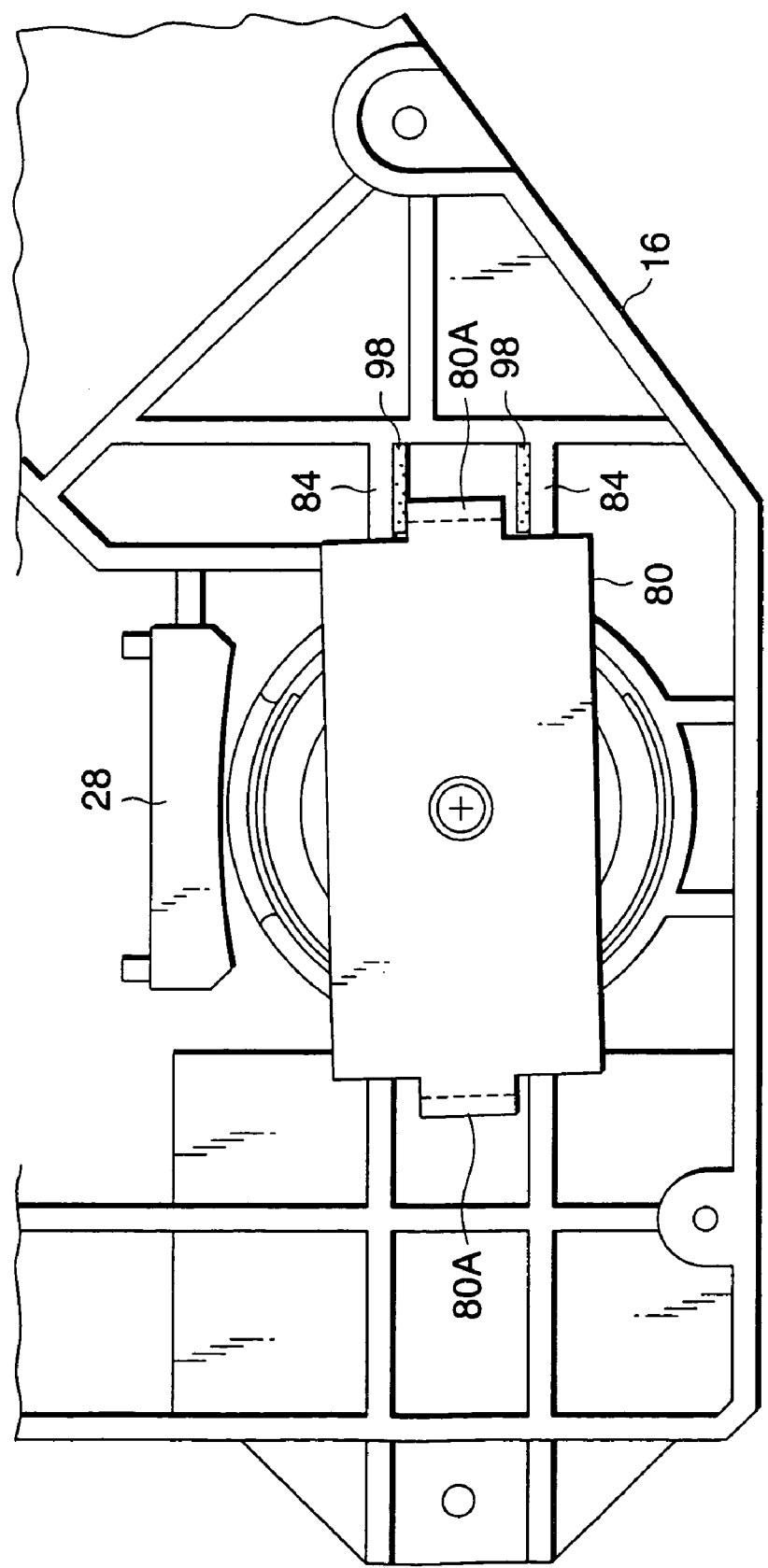
FIG. 27 is a plan view of the rotary deflector of the third embodiment.
Figure 28:
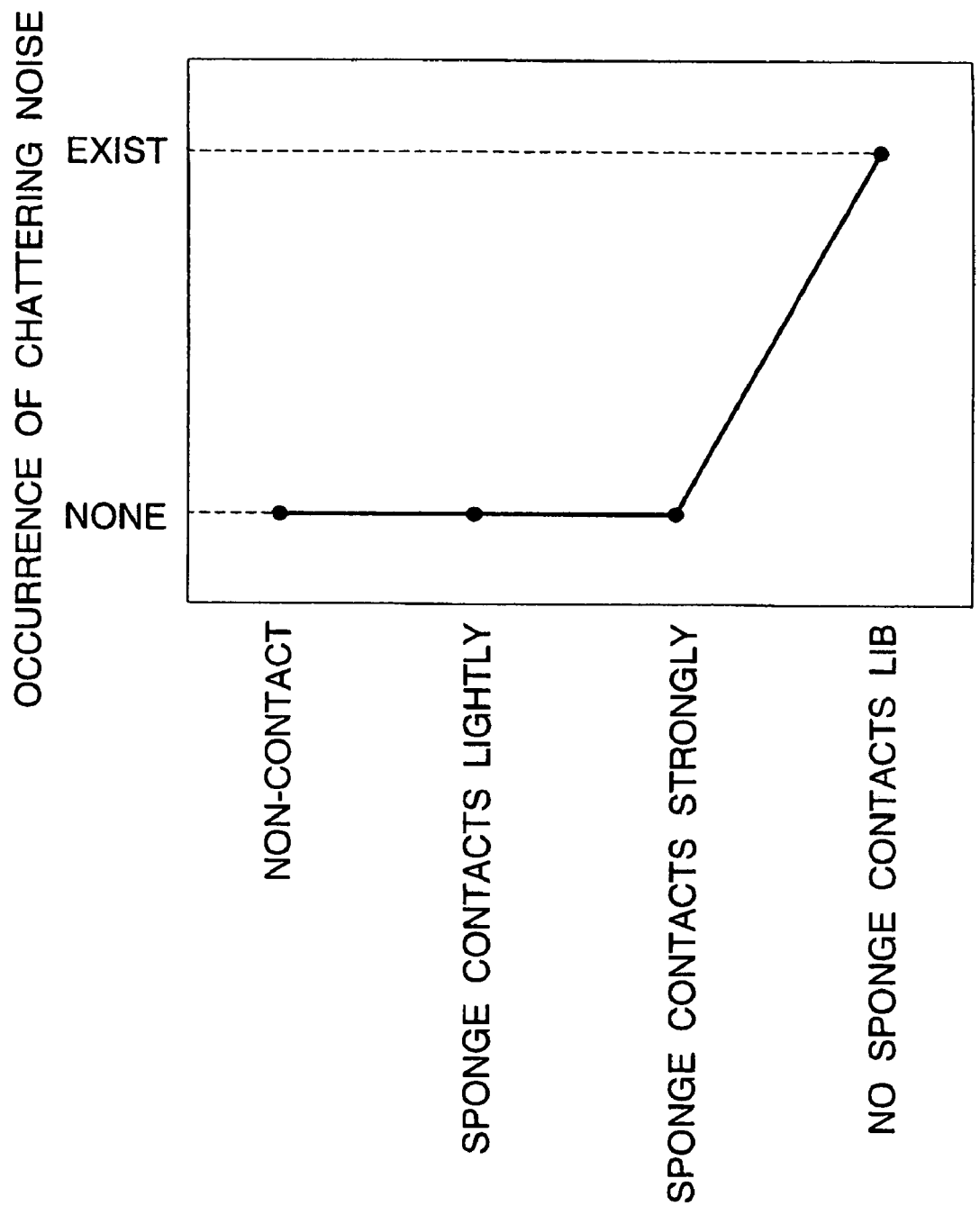
FIG. 28 is a graph showing the relationship between the mass member and the chattering noise.
Figure 29:
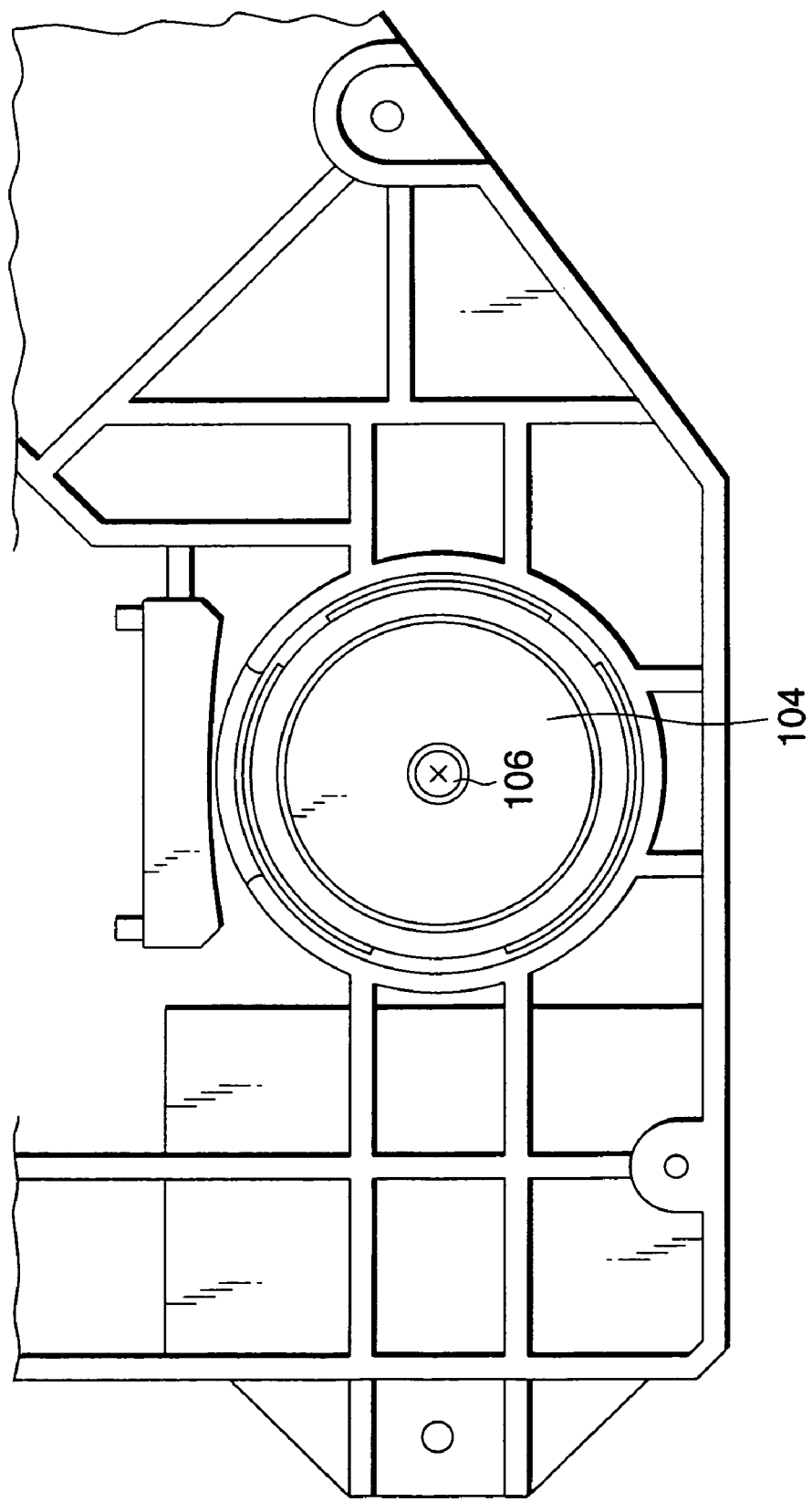
FIG. 29 is a plan view of the rotary deflector of the fourth embodiment.
Figure 30:
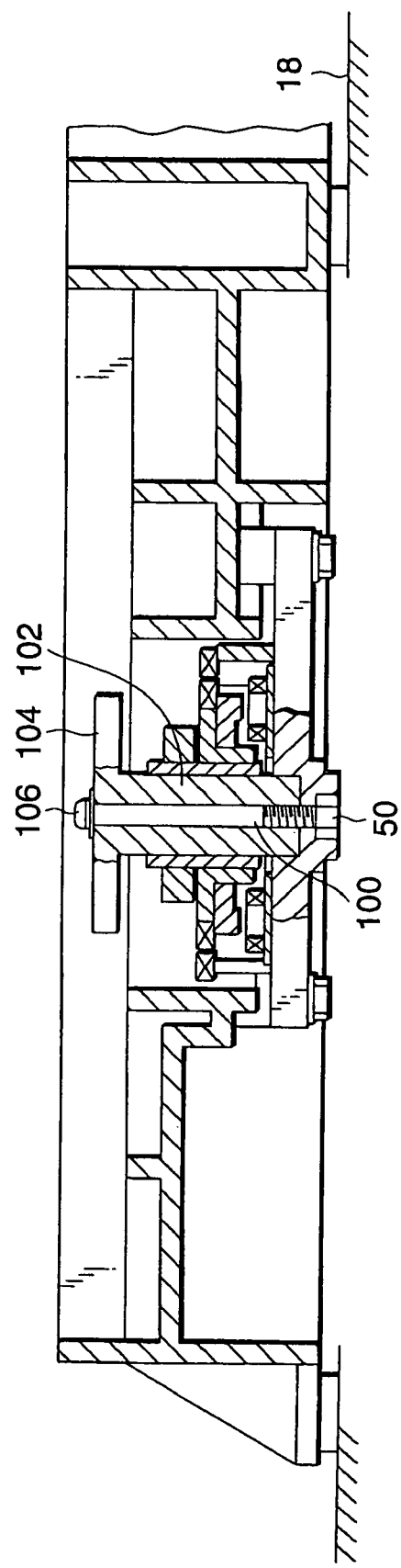
FIG. 30 is a sectional view of the rotary deflector of the fourth embodiment.

As shown in FIGS. 25 and 26, a sheet-like foaming sponge 98 is pasted as an elastic member on the both faces of the inside of the rib 84 and the hook 80A of the mass member 80 is positioned in the foaming sponge 98. It has been confirmed that when the hook 80A is pressed lightly or strongly against the foaming sponge 98 as shown in FIG. 27, no chattering noise occurs as shown in a graph in FIG. 28. Thus, the inclusion of the foaming sponge 98 allows to prevent such chattering noise from occurring that may occur when without foaming sponge 98 the hook 80A contacts with the rib 84.

Next, a rotary deflector of a fourth embodiment will be explained.

According to the fourth embodiment, a disk-like mass member 104 is integrally formed with a stationary shaft 102 at the upper part thereof. A long screw 100 is inserted through a penetrating section of the stationary shaft 102 and is fastened to a nut 50 by turning a head 106 thereof by a driver.

Thus, the rigidity of the stationary shaft increases and it becomes advantageous from the aspect of attaching space and production cost by integrally forming the stationary shaft with the mass member.

It is noted that although the housing has been made of synthetic resin in the embodiments described above, the vibration may be reduced further when the housing is made of aluminum whose rigidity is higher.

As described above, the invention allows the low noise and high image quality image forming apparatus to be realized by suppressing the vibration of the base in the target frequency range without deforming the housing. It also allows to prevent noise from occurring in switching the speed of the rotary deflector.

Still more, the optical scanning units may be made common because the reduction of vibration may be optimized by the mass member. It is also possible to achieve optimal tuning to lower vibration per each type machine and to reduce the balancing processes of the driving motor considerably by selecting the mass member.

While the preferred embodiments have been described, variations thereto will occur to those skilled in the art within the scope of the present inventive concepts which are delineated by the following claims.

What is claimed is:

1. A rotary deflector comprising a mass member detachably fixed to a non-rotary section of a driving motor for rotating a polygon mirror, wherein a periphery of the mass member is larger than a periphery of the non-rotary section of the driving motor and is larger than a periphery of the polygon mirror and, wherein the non-rotary section is a stationary shaft located at the center of rotation of the driving motor and the mass member is attached to the stationary shaft.

2. A rotary deflector comprising a mass member detachably fixed to a non-rotary section of a driving motor for rotating a polygon mirror, wherein a periphery of the mass member is larger than a periphery of the non-rotary section of the driving motor and is larger than a periphery of the polygon mirror, wherein the non-rotary section is a stationary shaft located at the center of rotation of the driving motor and the mass member is attached to the stationary shaft and, wherein the center of gravity of the mass member is located almost at the center of the stationary shaft.

3. A rotary deflector comprising a mass member detachably fixed to a non-rotary section of a driving motor for rotating a polygon mirror, wherein a periphery of the mass member is larger than a periphery of the non-rotary section of the driving motor and is larger than a periphery of the polygon mirror, wherein the non-rotary section is a stationary shaft located at the center of rotation of the driving motor and the mass member is attached to the stationary shaft and, wherein the mass member is a plate-like member and is symmetrical about the center of gravity.

4. The rotary deflector according to claim 1, wherein the mass member of a size capable of reducing vibration within the range of the number of rotation of the driving motor is attached.

5. The rotary deflector according to claim 4, wherein the weight of the mass member is 5 g or more.

6. The rotary deflector according to claim 1, further comprising:
   an engaging section formed at the upper part of the stationary shaft;
   an engaged section which is formed at the center of gravity of the mass member and which engages with the engaging section; and
   a fixing unit that fixes the engaged section and the engaging section.

* * * * *